United States Patent
Kipp et al.

(10) Patent No.: US 8,349,444 B2
(45) Date of Patent: *Jan. 8, 2013

(54) UTILITY MATERIALS INCORPORATING A MICROPARTICLE MATRIX

(75) Inventors: Michael D. Kipp, Highland, UT (US); Michael D. Ridges, American Fork, UT (US); William T. McCarvill, Salt Lake City, UT (US); Dilworth L. Pugh, Mapleton, UT (US)

(73) Assignee: Ashtech Industries, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,688

(22) Filed: Jul. 5, 2011

(65) Prior Publication Data

US 2012/0060440 A1 Mar. 15, 2012

Related U.S. Application Data

(63) Continuation of application No. 12/077,951, filed on Mar. 21, 2008, now abandoned.

(60) Provisional application No. 60/919,509, filed on Mar. 21, 2007, provisional application No. 60/961,130, filed on Jul. 17, 2007, provisional application No. 61/002,367, filed on Nov. 8, 2007.

(51) Int. Cl.
*B32B 9/04* (2006.01)
*B28B 5/00* (2006.01)

(52) U.S. Cl. ............... 428/318.4; 428/304.4; 428/312.2; 428/313.3; 428/402; 52/578; 264/241; 264/261

(58) Field of Classification Search ............... 428/304.4, 428/323, 312.2, 313.3, 318.4; 52/578; 264/241, 264/261
See application file for complete search history.

(56) References Cited

U.S. PATENT DOCUMENTS

| | | | |
|---|---|---|---|
| 1,881,420 A | 10/1932 | Treadway |
| 1,914,345 A | 6/1933 | Roos |
| 3,045,709 A | 7/1962 | Rap |
| 3,501,419 A | 3/1970 | Bridgeford |
| 3,528,846 A | 9/1970 | Calmer et al. |
| 3,697,422 A | 10/1972 | Makcle |
| 3,703,394 A | 11/1972 | Hemming et al. |
| 3,769,770 A | 11/1973 | Deschamps et al. |
| 3,781,170 A | 12/1973 | Nakao et al. |
| 3,782,985 A | 1/1974 | Gebhardt |

(Continued)

FOREIGN PATENT DOCUMENTS

AU 2004201393 10/2005

(Continued)

OTHER PUBLICATIONS

US 5,695,691, 12/1997, McLaughlin et al. (withdrawn).

(Continued)

*Primary Examiner* — Hai Vo
(74) *Attorney, Agent, or Firm* — Thorpe North & Western LLP

(57) ABSTRACT

A utility material can include microparticles, an organic binder and an inorganic binder. The microparticles can be present in an amount from about 25 wt % to about 60 wt %, based on wet formulation. The inorganic binder can optionally include sodium silicate. The organic binder can optionally include a vinyl acetate. The utility material can be formed into a variety of different products or building materials, such as wallboard, shear panels. In addition, the building material may be particularly used to attenuate sound.

17 Claims, 9 Drawing Sheets

U.S. PATENT DOCUMENTS

| | | |
|---|---|---|
| 3,933,513 A | 1/1976 | Mellows |
| 3,995,086 A | 11/1976 | Plungulan et al. |
| 4,025,686 A | 5/1977 | Zion |
| 4,074,482 A | 2/1978 | Klahr |
| 4,077,921 A | 3/1978 | Sharpe et al. |
| 4,079,162 A | 3/1978 | Metzger |
| 4,083,159 A | 4/1978 | Hatch et al. |
| 4,090,887 A | 5/1978 | Marquise et al. |
| 4,292,348 A | 9/1981 | Dolan |
| 4,303,061 A | 12/1981 | Torobin |
| 4,303,431 A | 12/1981 | Torobin |
| 4,303,433 A | 12/1981 | Torobin |
| 4,303,603 A | 12/1981 | Torobin |
| 4,303,729 A | 12/1981 | Torobin |
| 4,303,730 A | 12/1981 | Torobin |
| 4,303,731 A | 12/1981 | Torobin |
| 4,303,732 A | 12/1981 | Torobin |
| 4,303,736 A | 12/1981 | Torobin |
| 4,332,618 A | 6/1982 | Ballard |
| 4,357,436 A | 11/1982 | Zucker et al. |
| 4,364,790 A | 12/1982 | Delcoigne et al. |
| 4,377,414 A | 3/1983 | Buschmann et al. |
| 4,415,512 A | 11/1983 | Torobin |
| 4,424,196 A | 1/1984 | Palmer et al. |
| 4,424,300 A | 1/1984 | Udvardy et al. |
| 4,425,440 A | 1/1984 | Bioembergen et al. |
| 4,438,028 A | 3/1984 | Schmittmann et al. |
| 4,441,944 A | 4/1984 | Massey |
| 4,446,177 A | 5/1984 | Munoz et al. |
| 4,476,258 A | 10/1984 | Hiles |
| 4,492,732 A | 1/1985 | Murphy et al. |
| 4,502,901 A | 3/1985 | Burkard |
| 4,504,320 A | 3/1985 | Rizer et al. |
| 4,522,878 A | 6/1985 | Martin et al. |
| 4,548,196 A | 10/1985 | Torobin |
| 4,568,389 A | 2/1986 | Torobin |
| 4,582,534 A | 4/1986 | Torobin |
| 4,594,279 A | 6/1986 | Yoneno et al. |
| 4,594,368 A | 6/1986 | Salyer et al. |
| 4,596,845 A | 6/1986 | Koyama et al. |
| 4,623,390 A | 11/1986 | Delmonico |
| 4,632,876 A | 12/1986 | Laird et al. |
| 4,644,014 A | 2/1987 | Thomson et al. |
| 4,659,385 A | 4/1987 | Costopoulos et al. |
| 4,661,301 A | 4/1987 | Okada et al. |
| 4,661,533 A | 4/1987 | Stobby |
| 4,666,960 A | 5/1987 | Spaian |
| 4,671,994 A | 6/1987 | Cochran, Jr. |
| 4,673,697 A | 6/1987 | Rowley |
| 4,680,239 A | 7/1987 | Yano et al. |
| 4,681,788 A | 7/1987 | Barito et al. |
| 4,686,244 A | 8/1987 | Dietlein et al. |
| 4,686,252 A | 8/1987 | Burge et al. |
| 4,687,752 A | 8/1987 | Peters |
| 4,721,160 A | 1/1988 | Parcevaux et al. |
| 4,731,389 A | 3/1988 | Christopher et al. |
| 4,741,782 A | 5/1988 | Styron |
| 4,744,842 A | 5/1988 | Webster et al. |
| 4,760,296 A | 7/1988 | Johnston et al. |
| 4,770,708 A | 9/1988 | Atkins et al. |
| 4,780,484 A | 10/1988 | Schubert et al. |
| 4,798,753 A | 1/1989 | Abuaf et al. |
| 4,798,762 A | 1/1989 | Okada et al. |
| 4,839,394 A | 6/1989 | Champion |
| 4,861,097 A | 8/1989 | Wycech |
| 4,885,203 A | 12/1989 | Wakat |
| 4,901,500 A | 2/1990 | Wycech |
| 4,904,709 A | 2/1990 | Hermele |
| 4,933,031 A | 6/1990 | Blomberg et al. |
| 4,940,676 A | 7/1990 | Evans |
| 4,950,627 A | 8/1990 | Tokarz et al. |
| 4,960,184 A | 10/1990 | Woodward |
| 4,963,420 A | 10/1990 | Jarrin et al. |
| 4,988,478 A | 1/1991 | Held |
| 5,064,266 A | 11/1991 | Sun et al. |
| 5,079,329 A | 1/1992 | Muhlfeld et al. |
| 5,091,256 A | 2/1992 | Bopp et al. |
| 5,094,111 A | 3/1992 | Collins et al. |
| 5,098,577 A | 3/1992 | McLaughlin et al. |
| 5,125,812 A | 6/1992 | Held |
| 5,126,192 A | 6/1992 | Chellis et al. |
| 5,134,179 A | 7/1992 | Felegi, Jr. et al. |
| 5,140,089 A | 8/1992 | Muhlfeld et al. |
| 5,141,972 A | 8/1992 | Sato |
| 5,147,722 A | 9/1992 | Koslow |
| 5,162,397 A | 11/1992 | Descamps et al. |
| 5,211,238 A | 5/1993 | Carpenter |
| 5,217,552 A | 6/1993 | Miyajima |
| 5,218,016 A | 6/1993 | Jarrin et al. |
| 5,225,124 A | 7/1993 | Sorathia et al. |
| 5,228,494 A | 7/1993 | Rohatgi |
| 5,256,222 A | 10/1993 | Shepherd et al. |
| 5,302,634 A | 4/1994 | Mushovic |
| 5,342,566 A | 8/1994 | Schafer et al. |
| 5,359,735 A | 11/1994 | Stockwell |
| 5,369,147 A | 11/1994 | Mushovic |
| 5,393,794 A | 2/1995 | Sperber |
| 5,424,099 A | 6/1995 | Stewart et al. |
| 5,472,760 A | 12/1995 | Norvell |
| 5,476,343 A | 12/1995 | Sumner |
| 5,492,696 A | 2/1996 | Price et al. |
| 5,492,870 A | 2/1996 | Wilcox et al. |
| 5,506,046 A | 4/1996 | Andersen et al. |
| 5,508,072 A | 4/1996 | Andersen et al. |
| 5,512,324 A | 4/1996 | Paulus et al. |
| 5,534,058 A | 7/1996 | Strabala |
| 5,540,793 A | 7/1996 | Bals et al. |
| 5,543,186 A | 8/1996 | Andersen et al. |
| 5,549,859 A | 8/1996 | Andersen et al. |
| 5,571,592 A | 11/1996 | McGregor et al. |
| 5,574,561 A | 11/1996 | Boudreau et al. |
| 5,580,378 A | 12/1996 | Shulman |
| 5,582,670 A | 12/1996 | Andersen et al. |
| 5,600,930 A | 2/1997 | Drucker |
| 5,601,643 A | 2/1997 | Silverstrim et al. |
| 5,604,266 A | 2/1997 | Mushovic |
| 5,614,307 A | 3/1997 | Andersen et al. |
| 5,622,556 A | 4/1997 | Shulman |
| 5,624,737 A | 4/1997 | Fairbanks et al. |
| 5,626,954 A | 5/1997 | Andersen et al. |
| 5,631,097 A | 5/1997 | Andersen et al. |
| 5,679,145 A | 10/1997 | Andersen et al. |
| 5,683,772 A | 11/1997 | Andersen et al. |
| 5,711,362 A | 1/1998 | Rohatgi |
| 5,713,974 A | 2/1998 | Martin et al. |
| 5,725,652 A | 3/1998 | Shulman |
| 5,746,932 A | 5/1998 | Rendall et al. |
| 5,754,491 A | 5/1998 | Cushman |
| 5,766,686 A | 6/1998 | Perich et al. |
| 5,770,267 A | 6/1998 | Bullock, Jr. |
| 5,786,095 A | 7/1998 | Batdorf |
| 5,788,184 A | 8/1998 | Eddy |
| 5,795,102 A | 8/1998 | Corbishley |
| 5,798,151 A | 8/1998 | Andersen et al. |
| 5,810,961 A | 9/1998 | Andersen et al. |
| 5,814,250 A | 9/1998 | Dudt et al. |
| 5,817,230 A | 10/1998 | Groppo, Jr. et al. |
| 5,830,548 A | 11/1998 | Andersen et al. |
| 5,840,179 A | 11/1998 | Minkara et al. |
| 5,849,650 A | 12/1998 | Rorabaugh et al. |
| 5,862,772 A | 1/1999 | Yancey et al. |
| 5,866,641 A | 2/1999 | Ronden et al. |
| 5,884,960 A | 3/1999 | Wycech |
| 5,897,943 A | 4/1999 | Rohatgi |
| 5,899,256 A | 5/1999 | Rohatgi |
| 5,910,082 A | 6/1999 | Bender et al. |
| 5,913,002 A | 6/1999 | Jinag |
| 5,944,888 A | 8/1999 | Perich et al. |
| 5,948,323 A | 9/1999 | McLaughlin et al. |
| 5,965,257 A | 10/1999 | Ahluwalia |
| 5,971,631 A | 10/1999 | Poole et al. |
| 5,980,980 A | 11/1999 | Dichiara, Jr. et al. |
| 5,981,631 A | 11/1999 | Ronden |
| 5,983,984 A | 11/1999 | Auderhelde et al. |
| 5,988,396 A | 11/1999 | Minkara et al. |
| 6,020,062 A | 2/2000 | Questel et al. |
| 6,022,912 A | 2/2000 | Spitier et al. |

| | | | | | | |
|---|---|---|---|---|---|---|
| 6,058,979 | A | 5/2000 | Watkins | 6,811,603 B2 | 11/2004 | Brothers et al. |
| 6,060,535 | A | 5/2000 | Villar et al. | 6,814,798 B2 | 11/2004 | Vijn et al. |
| 6,074,727 | A | 6/2000 | Miller et al. | 6,831,876 B1 | 12/2004 | Cartwright |
| 6,085,865 | A | 7/2000 | Delverdler et al. | 6,833,203 B2 | 12/2004 | Bose et al. |
| 6,096,812 | A | 8/2000 | Hanafin et al. | 6,840,994 B2 | 1/2005 | Krowl et al. |
| 6,103,360 | A | 8/2000 | Caldwell et al. | 6,846,529 B2 | 1/2005 | Mohan et al. |
| 6,155,305 | A | 12/2000 | Sumner | 6,852,765 B2 | 2/2005 | Decker et al. |
| 6,165,308 | A | 12/2000 | Chen et al. | 6,858,280 B2 | 2/2005 | Allen et al. |
| 6,166,109 | A | 12/2000 | Spitler et al. | 6,865,811 B2 | 3/2005 | Wycech |
| 6,183,852 | B1 | 2/2001 | Rorabaugh et al. | 6,872,440 B1 | 3/2005 | Kiik et al. |
| 6,187,697 | B1 | 2/2001 | Jaffee et al. | 6,893,751 B2 | 5/2005 | Naji et al. |
| 6,194,051 | B1 | 2/2001 | Gagas et al. | 6,901,713 B2 | 6/2005 | Axsom |
| 6,207,738 | B1 | 3/2001 | Zuckerman et al. | 6,902,614 B2 | 6/2005 | Ratomski et al. |
| 6,231,970 | B1 | 5/2001 | Andersen et al. | 6,910,507 B2 | 6/2005 | Simon et al. |
| 6,245,842 | B1 | 6/2001 | Buxton et al. | 6,916,863 B2 | 7/2005 | Hemmings et al. |
| 6,251,979 | B1 | 6/2001 | Luongo | 6,919,111 B2 | 7/2005 | Swoboada et al. |
| 6,265,040 | B1 | 7/2001 | Neale et al. | 6,939,610 B1 | 9/2005 | Kaul |
| 6,277,454 | B1 | 8/2001 | Neale et al. | 6,953,129 B2 | 10/2005 | Delay |
| 6,280,759 | B1 | 8/2001 | Price et al. | 6,955,778 B2 | 10/2005 | Huntemann |
| 6,309,492 | B1 | 10/2001 | Seidner | 6,960,388 B2 | 11/2005 | Hallissy et al. |
| 6,319,968 | B1 | 11/2001 | Bildner et al. | 6,974,494 B1 | 12/2005 | Zahedi |
| 6,362,252 | B1 | 3/2002 | Prutkin | 6,988,343 B2 | 1/2006 | Gleeson et al. |
| 6,368,527 | B1 | 4/2002 | Gonfmakher et al. | 6,995,098 B2 | 2/2006 | McGrady et al. |
| 6,376,022 | B1 | 4/2002 | Mallow et al. | 7,021,018 B2 | 4/2006 | Peng |
| 6,379,497 | B1 | 4/2002 | Sandstrom et al. | 7,037,572 B2 | 5/2006 | Gleeson |
| 6,380,114 | B1 | 4/2002 | Brandy | 7,037,865 B1 | 5/2006 | Kimberly |
| 6,387,447 | B1 | 5/2002 | Grimm et al. | 7,041,167 B2 | 5/2006 | Jiang |
| 6,391,958 | B1 | 5/2002 | Luongo | 7,060,213 B2 | 6/2006 | Pearce |
| 6,397,549 | B1 | 6/2002 | Baldwin | 7,073,585 B2 | 7/2006 | Morgan et al. |
| 6,399,155 | B2 | 6/2002 | Child et al. | 7,074,499 B2 | 7/2006 | Schnurer et al. |
| 6,413,458 | B1 | 7/2002 | Pearce | 7,076,822 B2 | 7/2006 | Pearce |
| 6,417,125 | B1 | 7/2002 | Rorabaugh et al. | 7,083,758 B2 | 8/2006 | Tremblay |
| 6,420,034 | B1 | 7/2002 | Takahashi et al. | 7,090,918 B2 | 8/2006 | Leroux et al. |
| 6,432,482 | B1 | 8/2002 | Jaffee et al. | 7,091,277 B2 | 8/2006 | Rydin et al. |
| 6,444,162 | B1 | 9/2002 | Anshits et al. | 7,101,607 B2 | 9/2006 | Mollendorf et al. |
| 6,444,594 | B1 | 9/2002 | Child et al. | 7,115,542 B2 | 10/2006 | Tranter et al. |
| 6,458,412 | B2 | 10/2002 | Child et al. | 7,155,868 B2 | 1/2007 | Cole et al. |
| 6,472,579 | B1 | 10/2002 | Anshits et al. | 7,156,174 B2 | 1/2007 | Roddy et al. |
| 6,491,984 | B2 | 12/2002 | Rigosi et al. | 7,156,914 B2 | 1/2007 | Shimanovich |
| 6,503,976 | B2 | 1/2003 | Zuckerman et al. | 7,159,368 B2 | 1/2007 | Peng |
| 6,514,362 | B1 | 2/2003 | Zuckerman et al. | 7,166,355 B2 | 1/2007 | Jahns et al. |
| 6,531,222 | B1 | 3/2003 | Tanaka et al. | 7,174,962 B1 | 2/2007 | Roddy et al. |
| 6,534,176 | B2 | 3/2003 | Terase et al. | 7,204,065 B2 | 4/2007 | Naji |
| 6,545,066 | B1 | 4/2003 | Immordino, Jr. et al. | 7,217,458 B2 | 5/2007 | Liu et al. |
| 6,551,701 | B1 | 4/2003 | Nohr et al. | 7,291,234 B2 | 11/2007 | Glorioso |
| 6,559,082 | B1 | 5/2003 | Desvignes et al. | 7,318,288 B2 | 1/2008 | Zahedi et al. |
| 6,569,923 | B1 | 5/2003 | Slagter | 7,845,130 B2 | 12/2010 | Tonyan et al. |
| 6,572,697 | B2 | 6/2003 | Gleeson et al. | 2001/0006704 A1 | 7/2001 | Chen et al. |
| 6,572,736 | B2 | 6/2003 | Bush et al. | 2001/0026802 A1 | 10/2001 | Price et al. |
| 6,576,574 | B2 | 6/2003 | Child et al. | 2001/0043996 A1 | 11/2001 | Yamada et al. |
| 6,582,819 | B2 | 6/2003 | McDaniel et al. | 2001/0051249 A1 | 12/2001 | Gagas et al. |
| 6,584,742 | B1 | 7/2003 | Kligler et al. | 2002/0017224 A1 | 2/2002 | Horton |
| 6,586,353 | B1 | 7/2003 | Kiik et al. | 2002/0054957 A1 | 5/2002 | Johnsen et al. |
| 6,601,647 | B2 | 8/2003 | Brothers et al. | 2002/0069603 A1 | 6/2002 | Zornes |
| 6,620,487 | B1 | 9/2003 | Tonyan et al. | 2002/0103091 A1 | 8/2002 | Kodall |
| 6,630,221 | B1 | 10/2003 | Wong | 2002/0112648 A1 | 8/2002 | Krowl et al. |
| 6,631,603 | B2 | 10/2003 | Zomes | 2002/0128142 A1 | 9/2002 | Godeke et al. |
| 6,631,766 | B2 | 10/2003 | Brothers et al. | 2002/0142022 A1 | 10/2002 | Price et al. |
| 6,632,527 | B1 | 10/2003 | McDaniel et al. | 2002/0157573 A1 | 10/2002 | Pellet |
| 6,644,405 | B2 | 11/2003 | Vijn et al. | 2002/0170467 A1 | 11/2002 | Naji et al. |
| 6,648,961 | B2 | 11/2003 | Brothers et al. | 2002/0175126 A1 | 11/2002 | Naji et al. |
| 6,659,362 | B1 | 12/2003 | Halilissy et al. | 2002/0178672 A1 | 12/2002 | Robinson et al. |
| 6,660,078 | B2 | 12/2003 | Brothers et al. | 2002/0179219 A1 | 12/2002 | Naji et al. |
| 6,660,667 | B2 | 12/2003 | Zuckerman et al. | 2002/0189499 A1 | 12/2002 | Naji et al. |
| 6,667,261 | B1 | 12/2003 | Anshits et al. | 2003/0000424 A1 | 1/2003 | Naji et al. |
| 6,673,144 | B2 | 1/2004 | Immordino, Jr. et al. | 2003/0029360 A1 | 2/2003 | Krowl et al. |
| 6,673,432 | B2 | 1/2004 | Kiik et al. | 2003/0054157 A1 | 3/2003 | Taymourian et al. |
| 6,692,678 | B2 | 2/2004 | Krowl et al. | 2003/0056696 A1 | 3/2003 | Fenske et al. |
| 6,699,522 | B2 | 3/2004 | Sakakibara | 2003/0057594 A1 | 3/2003 | Andersen et al. |
| 6,699,559 | B1 | 3/2004 | Milburn | 2003/0087029 A1 | 5/2003 | Decker et al. |
| 6,708,456 | B2 | 3/2004 | Kiik et al. | 2003/0096899 A1 | 5/2003 | Pearce |
| 6,713,008 | B1 | 3/2004 | Teeter | 2003/0126817 A1 | 7/2003 | Gleeson et al. |
| 6,716,293 | B2 | 4/2004 | Taymourian et al. | 2003/0126822 A1 | 7/2003 | Gleeson |
| 6,739,806 | B1 | 5/2004 | Szymansik et al. | 2003/0129348 A1 | 7/2003 | Peng |
| 6,740,373 | B1 | 5/2004 | Swoboda et al. | 2003/0131550 A1 | 7/2003 | Cole et al. |
| 6,743,830 | B2 | 6/2004 | Soane et al. | 2003/0134920 A1 | 7/2003 | Poisl et al. |
| 6,749,897 | B2 | 6/2004 | Naji et al. | 2003/0136072 A1 | 7/2003 | Peng |
| 6,758,305 | B2 | 7/2004 | Gelin et al. | 2003/0153635 A1 | 8/2003 | Spitler et al. |
| 6,802,938 | B2 | 10/2004 | Mohan et al. | 2003/0175497 A1 | 9/2003 | Kobe et al. |

| | | |
|---|---|---|
| 2003/0205172 A1 | 11/2003 | Gleeson et al. |
| 2004/0003570 A1 | 1/2004 | Phillips et al. |
| 2004/0003759 A1 | 1/2004 | Brothers et al. |
| 2004/0022941 A1 | 2/2004 | Glorioso |
| 2004/0054035 A1 | 3/2004 | Hallissy et al. |
| 2004/0067352 A1 | 4/2004 | Hagerman et al. |
| 2004/0074184 A1 | 4/2004 | Naji |
| 2004/0081827 A1 | 4/2004 | Data et al. |
| 2004/0102534 A1 | 5/2004 | Orpin |
| 2004/0123555 A1 | 7/2004 | Cole |
| 2004/0157961 A1 | 8/2004 | Tullos et al. |
| 2004/0170873 A1 | 9/2004 | Smith |
| 2004/0171499 A1 | 9/2004 | Ravi et al. |
| 2004/0176486 A1 | 9/2004 | Gloriso et al. |
| 2004/0192148 A1 | 9/2004 | Kajander |
| 2004/0194421 A1 | 10/2004 | Canti |
| 2004/0194657 A1 | 10/2004 | Laily |
| 2004/0202810 A1 | 10/2004 | Peng |
| 2004/0211139 A1 | 10/2004 | Peng |
| 2004/0221529 A1 | 11/2004 | Zornes |
| 2004/0226098 A1 | 11/2004 | Pearce |
| 2004/0226099 A1 | 11/2004 | Pearce |
| 2004/0229986 A1 | 11/2004 | Pearce |
| 2004/0234595 A1 | 11/2004 | Mohammad |
| 2004/0235379 A1 | 11/2004 | Ahtuwalia et al. |
| 2004/0244654 A1 | 12/2004 | Allouche et al. |
| 2004/0249005 A1 | 12/2004 | Kron et al. |
| 2005/0011412 A1 | 1/2005 | Vijn et al. |
| 2005/0017396 A1 | 1/2005 | Pearce et al. |
| 2005/0019548 A1 | 1/2005 | Liu et al. |
| 2005/0019552 A1 | 1/2005 | Wiersma et al. |
| 2005/0025952 A1 | 2/2005 | Field et al. |
| 2005/0072087 A1 | 4/2005 | Fanucci et al. |
| 2005/0079352 A1 | 4/2005 | Glorioso et al. |
| 2005/0090615 A1 | 4/2005 | Fisher |
| 2005/0126441 A1 | 6/2005 | Skelhorn |
| 2005/0133183 A1 | 6/2005 | Mohan et al. |
| 2005/0137279 A1 | 6/2005 | Decker et al. |
| 2005/0153070 A1 | 7/2005 | Decker et al. |
| 2005/0176833 A1 | 8/2005 | Tay |
| 2005/0181693 A1 | 8/2005 | Kajander |
| 2005/0197444 A1 | 9/2005 | Kyte et al. |
| 2005/0202258 A1 | 9/2005 | Swales et al. |
| 2005/0252420 A1 | 11/2005 | Timmons |
| 2005/0255318 A1 | 11/2005 | Czemy |
| 2005/0256228 A1 | 11/2005 | Ariel |
| 2005/0281997 A1 | 12/2005 | Grah |
| 2005/0287293 A1 | 12/2005 | Rothman |
| 2005/0288394 A1 | 12/2005 | Rothman et al. |
| 2006/0000155 A1 | 1/2006 | Wagner |
| 2006/0016617 A1 | 1/2006 | Corbishley |
| 2006/0037815 A1 | 2/2006 | Schabel, Jr. |
| 2006/0040096 A1 | 2/2006 | Eadara et al. |
| 2006/0051595 A1 | 3/2006 | Gaudeus et al. |
| 2006/0054059 A1 | 3/2006 | Dubey et al. |
| 2006/0054061 A1 | 3/2006 | Ruddick |
| 2006/0059825 A1 | 3/2006 | Wiercinski et al. |
| 2006/0084743 A1 | 4/2006 | Chen |
| 2006/0096074 A1 | 5/2006 | Foster et al. |
| 2006/0099405 A1 | 5/2006 | Gulselin et al. |
| 2006/0101785 A1 | 5/2006 | Wiercinski et al. |
| 2006/0144005 A1 | 7/2006 | Tonyan et al. |
| 2006/0147681 A1 | 7/2006 | Dubey |
| 2006/0160914 A1 | 7/2006 | Orpin |
| 2006/0165885 A1 | 7/2006 | Fay |
| 2006/0168906 A1 | 8/2006 | Tonyan et al. |
| 2006/0174572 A1 | 8/2006 | Tonyan et al. |
| 2006/0177661 A1 | 8/2006 | Smith et al. |
| 2006/0178453 A1 | 8/2006 | Bohler |
| 2006/0178461 A1 | 8/2006 | Bohler et al. |
| 2006/0185267 A1 | 8/2006 | Tonyan et al. |
| 2006/0188674 A1 | 8/2006 | Fernette et al. |
| 2006/0216471 A1 | 9/2006 | Grah et al. |
| 2006/0253988 A1 | 11/2006 | Pearce |
| 2006/0260811 A1 | 11/2006 | Nguyen et al. |
| 2006/0269738 A1 | 11/2006 | Kimberly |
| 2006/0280970 A1 | 12/2006 | Lettkeman et al. |
| 2007/0020475 A1 | 1/2007 | Prince et al. |
| 2007/0027227 A1 | 2/2007 | Shutov |
| 2007/0027234 A1 | 2/2007 | Sigworth et al. |
| 2007/0044397 A1 | 3/2007 | Wiercinski et al. |
| 2007/0048445 A1 | 3/2007 | DiMario |
| 2007/0048504 A1 | 3/2007 | DiMario |
| 2007/0054797 A1 | 3/2007 | Thomas |
| 2007/0056476 A1 | 3/2007 | Roddy et al. |
| 2007/0062143 A1 | 3/2007 | Noushad |
| 2007/0077436 A1 | 4/2007 | Naji et al. |
| 2007/0093392 A1 | 4/2007 | Vavra et al. |
| 2007/0094992 A1 | 5/2007 | Antonic |
| 2007/0130864 A1 | 6/2007 | Semmens et al. |
| 2007/0141316 A1 | 6/2007 | McGrath et al. |
| 2007/0148429 A1 | 6/2007 | McGrath et al. |
| 2007/0155859 A1 | 7/2007 | Song et al. |
| 2007/0175126 A1 | 8/2007 | Tonyan et al. |
| 2007/0193143 A1 | 8/2007 | Antonic |
| 2007/0214676 A1 | 9/2007 | Zaheidi et al. |
| 2007/0237829 A1 | 10/2007 | Dadachova et al. |
| 2007/0261224 A1 | 11/2007 | McLeod |
| 2007/0294974 A1 | 12/2007 | Tonyan et al. |
| 2008/0098935 A1 | 5/2008 | Roth et al. |
| 2008/0099133 A1 | 5/2008 | Stivender |
| 2008/0099171 A1 | 5/2008 | Frank et al. |
| 2008/0101150 A1 | 5/2008 | George et al. |
| 2008/0101151 A1 | 5/2008 | Frank et al. |
| 2008/0110276 A1 | 5/2008 | Frank et al. |
| 2009/0004459 A1 | 1/2009 | Kipp et al. |
| 2009/0107059 A1 | 4/2009 | Kipp et al. |
| 2009/0239059 A1 | 9/2009 | Kipp et al. |
| 2009/0239429 A1 | 9/2009 | Kipp et al. |
| 2010/0016459 A1 | 1/2010 | Cernohous |
| 2010/0116405 A1 | 5/2010 | Kipp |

FOREIGN PATENT DOCUMENTS

| | | |
|---|---|---|
| EP | 0475302 | 3/1992 |
| EP | 1568489 | 11/1999 |
| EP | 1 016 757 | 7/2000 |
| EP | 1 038 898 | 9/2000 |
| EP | 1 272 340 | 4/2005 |
| GB | 2041384 | 9/1980 |
| GB | 2357111 | 6/2001 |
| JP | 5-269722 | 10/1993 |
| JP | 8-1854 | 1/1996 |
| JP | 09-156010 | 6/1997 |
| JP | 11-322880 | 11/1999 |
| JP | 11-351610 | 12/1999 |
| JP | 2002-144468 | 5/2002 |
| JP | 2006/083048 | 3/2006 |
| KR | 10-1996-7958 | 3/1996 |
| WO | WO 93/10972 | 6/1993 |
| WO | WO 9316245 | 8/1993 |
| WO | WO 97/17508 | 5/1997 |
| WO | WO 99/44087 | 9/1999 |
| WO | WO 00/24577 | 5/2000 |
| WO | WO 00/27635 | 5/2000 |
| WO | WO 00/35847 | 6/2000 |
| WO | WO 00/36236 | 6/2000 |
| WO | WO 01/59381 | 8/2001 |
| WO | WO 01/66669 | 9/2001 |
| WO | WO 02/42064 | 5/2002 |
| WO | WO 02/060839 | 8/2002 |
| WO | WO 02/092927 | 11/2002 |
| WO | WO 02/092928 | 11/2002 |
| WO | WO 02/100957 | 12/2002 |
| WO | WO 03/045687 | 6/2003 |
| WO | WO 03/045688 | 6/2003 |
| WO | WO 03/046100 | 6/2003 |
| WO | WO 03/078735 | 9/2003 |
| WO | WO 2004/005640 | 1/2004 |
| WO | WO 2004/101903 | 11/2004 |
| WO | WO 2005/003056 | 1/2005 |
| WO | WO 2005/016608 | 2/2005 |
| WO | WO 2006/000035 | 1/2006 |
| WO | WO 2006/007413 | 1/2006 |
| WO | WO 2006/018904 | 2/2006 |
| WO | WO 2006/034146 | 3/2006 |
| WO | WO 2006/065259 | 6/2006 |
| WO | WO 2006/071519 | 7/2006 |
| WO | WO 2006/071920 | 7/2006 |

| WO | WO 2006/073540 | 7/2006 |
| WO | WO 2006/073723 | 7/2006 |
| WO | WO 2006/081066 | 8/2006 |
| WO | WO 2006/081080 | 8/2006 |
| WO | WO 2006/081155 | 8/2006 |
| WO | WO 2006/081156 | 8/2006 |
| WO | WO 2006/113379 | 10/2006 |
| WO | WO 2007/020657 | 2/2007 |
| WO | WO 2007/021653 | 2/2007 |
| WO | WO 2007/041272 | 4/2007 |
| WO | WO 2007/047318 | 4/2007 |
| WO | WO 2007/056629 | 5/2007 |
| WO | WO 2007/075693 | 7/2007 |
| WO | WO 2007/079104 | 7/2007 |
| WO | WO 2007/081645 | 7/2007 |
| WO | WO 2007/097988 | 8/2007 |
| WO | WO 2008/002511 | 1/2008 |
| WO | WO 2008/003147 | 1/2008 |
| WO | WO 2008/020768 | 2/2008 |
| WO | WO 2008/037001 | 4/2008 |
| WO | WO 2008/057273 | 5/2008 |
| WO | WO 2008/057274 | 5/2008 |
| WO | WO 2008/057275 | 5/2008 |
| WO | WO 2008/057390 | 5/2008 |
| WO | WO 2008/076376 | 6/2008 |

OTHER PUBLICATIONS

U.S. Appl. No. 12/612,675, filed Nov. 4, 2009; Michael D. Kipp; office action issued Mar. 23, 2012.
U.S. Appl. No. 12/238,399, filed Sep. 25, 2008; Michael D. Kipp; office action issued Jan. 31, 2012.
The 3M Ceramic Microspheres brochure; 2010; 2 pages.
U.S. Appl. No. 13/176,688, filed Jul. 5, 2011; Michael D. Kipp.
U.S. Appl. No. 13/176,692, filed Jul. 5, 2011; Michael D. Kipp.
U.S. Appl. No. 13/206,348, filed Aug. 9, 2011; Michael D. Kipp.
U.S. Appl. No. 13/206,348, filed Aug. 9, 2011; Michael D. Kipp; office action dated Sep. 26, 2012.
U.S. Appl. No. 13/176,692, filed Jul. 5, 2011; Michael D. Kipp; office action dated Aug. 30, 2012.
U.S. Appl. No. 12/612,675, filed Nov. 4, 2009; Michael D. Kipp; office action dated Aug. 21, 2012.

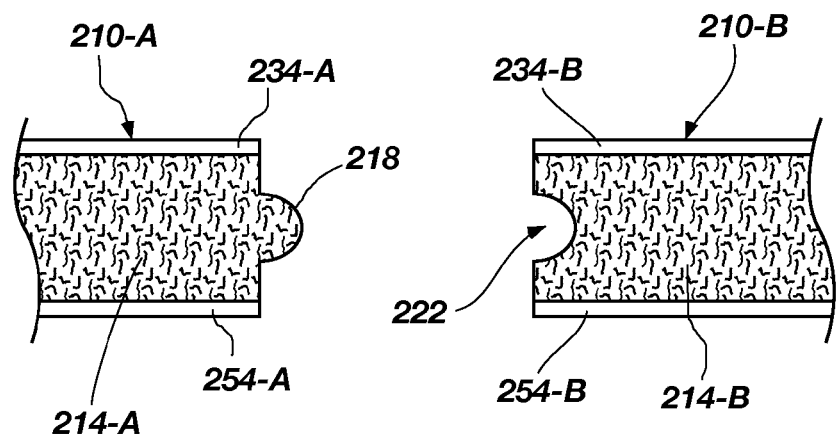
FIG. 5-A
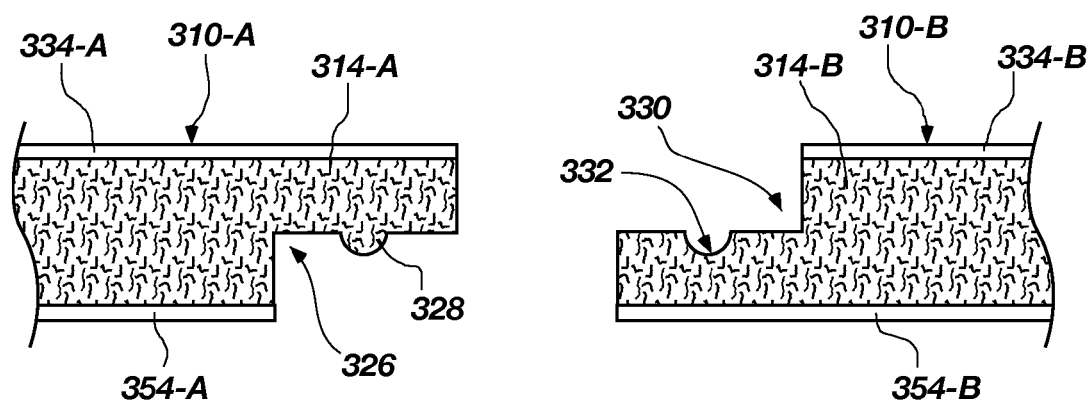
FIG. 5-B

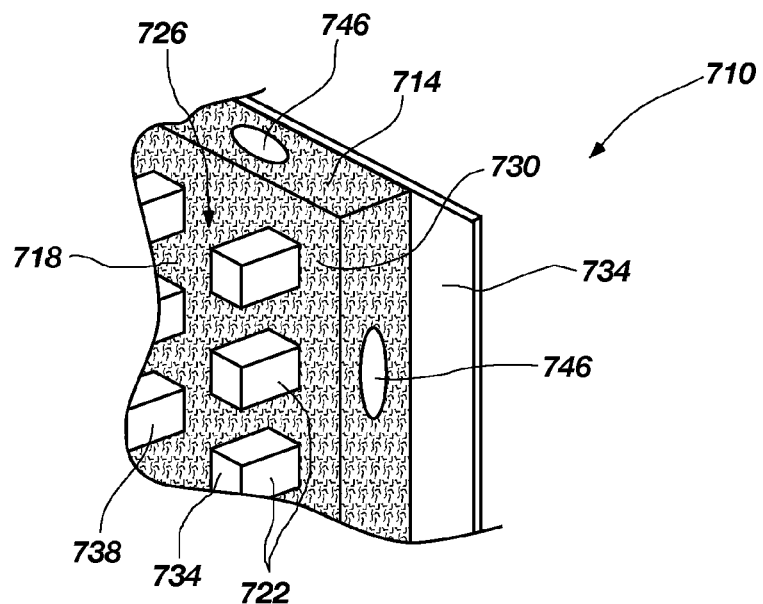
FIG. 6
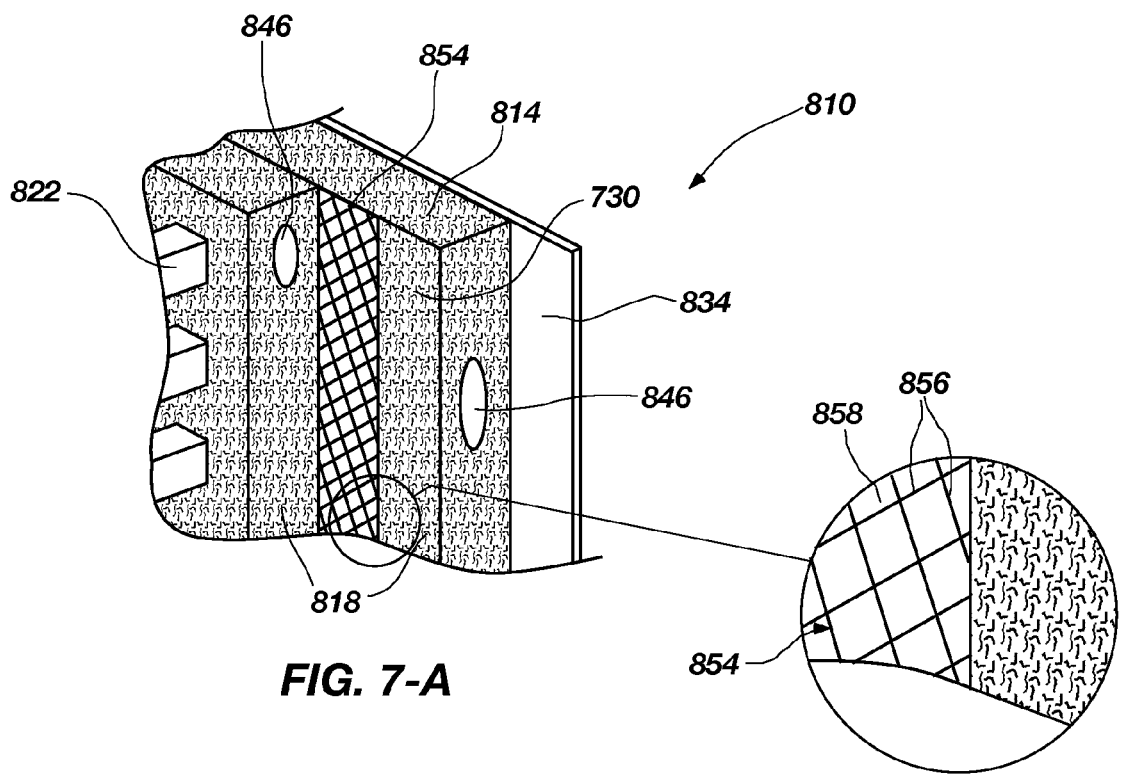
FIG. 7-A
FIG. 7-B

UTILITY MATERIALS INCORPORATING A MICROPARTICLE MATRIX

RELATED APPLICATIONS

This application is a continuation of U.S. application Ser. No. 12/077,951, filed on Mar. 21, 2008, now abandoned which claims the benefit of U.S. Provisional Patent Application No. 60/919,509, filed on Mar. 21, 2007, and of U.S. Provisional Patent Application No. 60/961,130, filed on Jul. 17, 2007, and of U.S. Provisional Patent Application No. 61/001,367, filed on Nov. 7, 2007, which are each incorporated by reference herein in their entireties.

FIELD OF THE INVENTION

The present invention relates generally to various utility and/or building materials, such as wallboard, insulation, etc. Accordingly, the present invention involves the fields of chemistry, chemical engineering, manufacturing engineering, construction, and materials science.

BACKGROUND OF THE INVENTION AND RELATED ART

Many different types of building or utility materials, such as wallboard insulation, blown-in insulation, acoustical or sound dampening/absorbing materials, etc. exist in the art. These are all designed to provide a specific function within a structure. In addition, the composition of ingredients or components making up these utility materials varies greatly. Although there are many different available compositions making up the many different utility materials, relatively few of these incorporate microparticles, such as naturally occurring cenospheres or synthetically manufactured Extendospheres™, into their makeup.

In addition, many different types of naturally occurring and artificial microparticles exist. Cenospheres are naturally occurring microparticles that are part of the "fly ash" byproduct generated in coal burning plants. Billions of tons of coal are burned annually in many plants worldwide to generate electricity, and as a result, over 100 million tons of coal or fly ash byproduct is produced. Fly ash is the fine powder formed from the mineral matter in coal, consisting of the noncombustible matter in coal plus a small amount of carbon that remains from incomplete combustion. It is called "fly" ash because it is transported from the combustion chamber by exhaust gases. Fly ash is generally light tan in color and consists mostly of different sized glassy spheres, the cenospheres. Properties of fly ash vary significantly with coal composition and plant operating conditions. Only a small percentage of the total amount is used, with the rest being disposed of mainly in landfills. Increasing cost and heightened regulations are making the disposal of fly ash an undesirable option. Although fly ash has found its way into a variety of useful applications in different industries, including the building and construction industries, for one or more reasons its success as a suitable utility or building material has been limited. Two specific classes of fly ash are defined by ASTM C618: Class F and Class C. The class distinction relies principally on differing content of components in the ash. As such, the differing classes can behave chemically different. One major distinction is the amount of lime or calcium oxide typically present. In Class F fly ash, generally less than 10 wt % is present. On the contrary, in Class C fly ash, generally more than 20 wt % lime is present.

In addition, there are several artificially manufactured microparticles used for a variety of purposes. Although such microparticles tend to be more consistent and uniform in their makeup and structure, they also tend to be extremely expensive and cost prohibitive for many applications.

Of particular concern in many building structures is how well noise or sound travels through the partitions or walls of the building structure, whether these are interior or exterior walls. In most cases, it is desirable to keep sound transmission across partitions as minimal as possible. Therefore, the ability for structural partitions or walls to attenuate (e.g., absorb or scatter) sound is an important design consideration. Most building materials, such as insulation, some wallboard products, etc., are designed with some degree of sound attenuation or absorption properties in mind as it is often desirable to minimize, or at least reduce, the amount of sound transmission through a partition. With respect to building structures, building materials such as wallboard, insulation, and certain types of paint, are considered materials that can contribute to enhanced sound attenuation properties, or in other words, a reduction in sound transmission.

Wallboard is a common utility or building material, which comes in many different types, designs, and sizes. Wallboard can be configured to exhibit many different properties or characteristics, such as different sound absorption, heat transfer and/or fire resistance properties. By far, the most common type of wallboard is drywall or gypsum board. Drywall comprises an inner core of gypsum, the semi-hydrous form of calcium sulphate ($CaSO_4 \cdot \frac{1}{2} H_2O$), disposed between two facing membranes, typically paper or fiberglass mats.

The most commonly used drywall is one-half-inch thick but can range from one quarter (6.35 mm) to one inch (25 mm) in thickness. For soundproofing or fire resistance, two layers of drywall are sometimes laid at right angles to one another. Drywall provides a thermal resistance, or R value, of 0.32 for three-eighths-inch board, 0.45 for half inch, 0.56 for five-eighths inch and 0.83 for one-inch board. In addition to increased R-value, thicker drywall has a slightly higher Sound Transmission Class (STC) rating.

STC, part of ASTM International Classification E413 and E90, is a widely used standard for rating how well a building material attenuates airborne sound. The STC number is derived from sound attenuation values tested at sixteen standard frequencies from 125 Hz to 4000 Hz. These transmission-loss values are then plotted on a sound pressure level graph and the resulting curve is compared to a standard reference contour. Acoustical engineers fit these values to the appropriate TL Curve (or Transmission Loss) to determine an STC rating. STC can be thought of as the decibel reduction in noise that a wall or other partition can provide. The dB scale is logarithmic, with the human ear perceiving a 10 dB reduction in sound as roughly halving the volume. Therefore, any reduction in dB is significant. The reduction in dB for the same material depends upon the frequency of the sound transmission. The higher the STC rating, the more effective the barrier is at reducing the transmission of most common sound frequencies.

Conventional interior walls in homes or buildings have opposing sheets of drywall mounted on a stud frame or stud wall. In this arrangement, with the drywall panels having a ½ inch thickness, the interior wall measures an STC of about 33. Adding fiberglass insulation helps, but only increases the STC to 36-39, depending upon the type and quality of insulation, as well as stud and screw spacing. As wallboard is typically comprised of several sheets or panels, the small cracks or gaps between panels, or any other cracks or gaps in the wall structure are referred to as "flanking paths," and will allow sound to transmit more freely, thus resulting in a lower overall STC rating.

Similarly, the Outdoor-Indoor Transmission Class (OITC) is the widely used standard for indicating the rate of transmission of sound between outdoor and indoor spaces. OITC testing typically considers frequencies down to 80 Hz and is weighted more to lower frequencies.

SUMMARY OF THE INVENTION

In light of the problems and deficiencies inherent in the prior art, the present invention seeks to overcome these by providing a utility material including a microparticle-based core matrix. The present disclosure describes a utility material having an improved water resistant, heat resistant, strength, Sound Transmission Class rating and other beneficial properties over conventional utility materials.

The utility material can include a core matrix having a plurality of microparticles, and an organic binder and an inorganic binder. In one aspect, the core matrix can include from about 25 wt % to about 60 wt % of microparticles based on wet formulation, the microparticles having a size of from about 200 to about 800 microns. In another aspect, the binders can include sodium silicate and/or vinyl acetate. In one embodiment, the sodium silicate can be present in an amount from about 20 wt % to about 36 wt %. In another embodiment, the vinyl acetate can be present in an amount from about 5 wt % to about 15 wt %.

Various methods of manufacture, as well as various forms of utility material including the core matrix are disclosed herein.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 5-A illustrates a detailed partial end view of a wallboard building material having a coupling system formed therein in accordance with one exemplary embodiment of the present invention;

FIG. 5-B illustrates a detailed partial end view of a wallboard building material having a coupling system formed therein in accordance with another exemplary embodiment of the present invention;

FIG. 6 illustrates a detailed perspective view of a wallboard building material in accordance with one exemplary embodiment of the present invention, wherein the building material comprises a microparticle-based core matrix, a multi-elevational surface configuration formed in one surface of the core matrix, and a facing sheet disposed on an opposing surface of the core matrix;

FIG. 7-A illustrates a detailed perspective view of a wallboard building material in accordance with another exemplary embodiment of the present invention, wherein the building material comprises a microparticle-based core matrix, a lath disposed or sandwiched within the core matrix, a multi-elevational surface configuration formed in one surface of the core matrix, and a facing sheet disposed on an opposing surface of the core matrix;

FIG. 7-B illustrates a detailed view of the building material of FIG. 7-A;

DETAILED DESCRIPTION OF EXEMPLARY EMBODIMENTS

Figure 1:
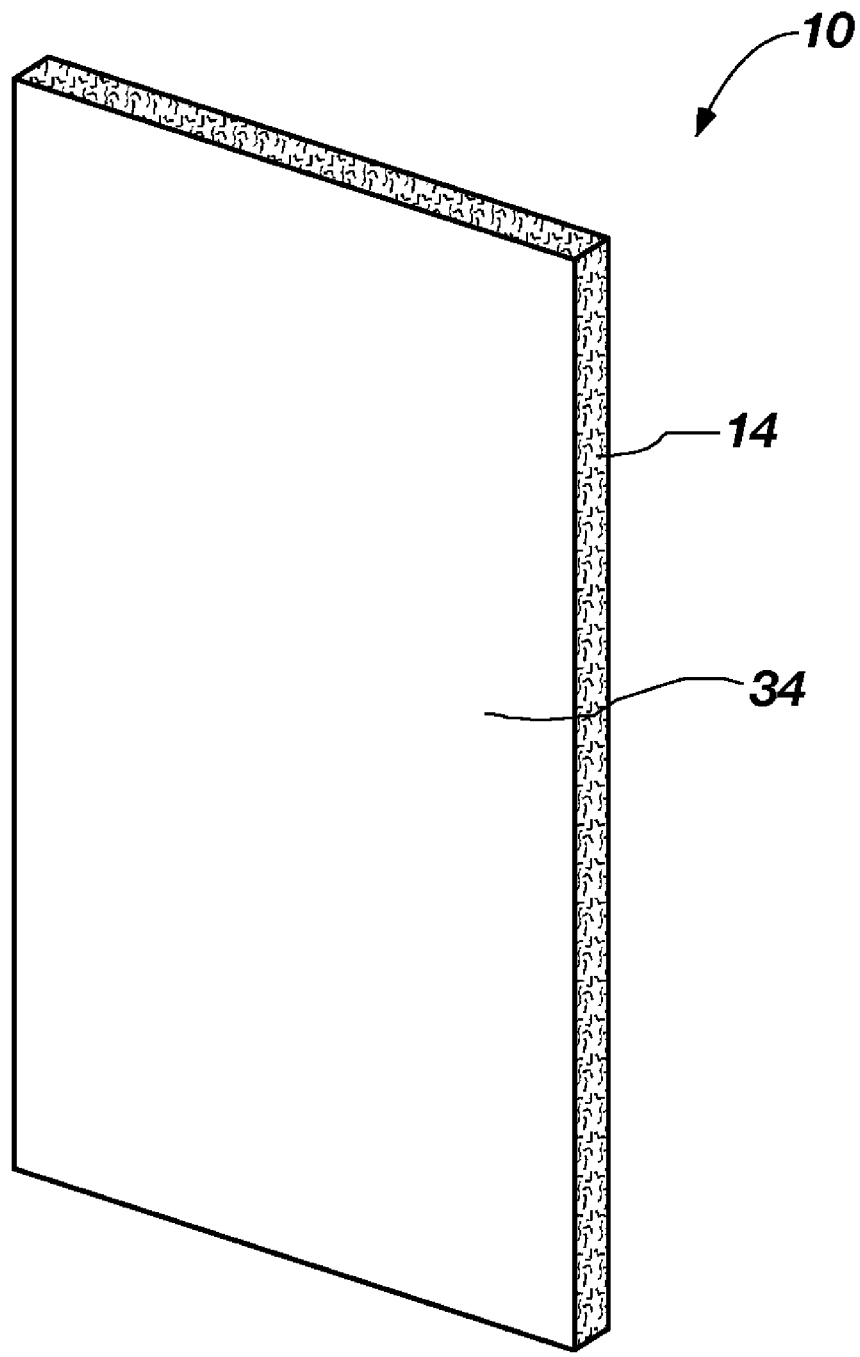
FIG. 1 illustrates a perspective view of a wallboard building material in accordance with one exemplary embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes various utility materials formulated using a plurality of microparticles. The present invention also describes a various methods used to produce or fabricate different utility materials, as well as various applications for such utility materials. In one aspect, a wallboard building material comprises a core matrix disposed between opposing facing sheets or layers, such as the type of paper common on conventional drywall-type wallboard products. The composition of the core matrix comprises a plurality of hollow, inert, lightweight naturally occurring or synthetic microspheres that are substantially spherical in geometry (hereinafter "microspheres"), as well as at least one binder configured to adhere the microspheres together, and to form a plurality of voids present throughout the core matrix. Embodiments of the utility materials presented herein can comprise a plurality of microparticles that are at least bound or adhered together, and preferably bonded together, by a binder to create a matrix structure having a plurality of voids defined therein. The microparticles are interspersed and suspended in a composition, comprising at least the binder, and perhaps other ingredients, such as a surfactant or foaming agent. Depending upon the selected composition, the utility materials may be configured to exhibit certain physical and performance properties, such as strength, flexibility, hardness, as well as thermal and/or acoustical properties, fire resistant properties, etc.

In one aspect, the binder used in wallboard may comprise an inorganic binder solution, an organic or latex binder solution, or both of these in combination. The core matrix may also comprise various additives, fillers, reinforcement materials, etc. Each of the components of the present invention wallboard building material, as well as other features and systems, are described in greater detail below. The present disclosure further describes a method for manufacturing a wallboard building material.

The presently disclosed utility material, associated wallboard embodiments, and associated methods of making and using such utility materials provide several significant advantages over prior related utility materials, such as, e.g., wallboard products, and particularly drywall, some of which are recited here and throughout the following more detailed description. First, the wallboard building material provides enhanced thermal properties. For example, in one aspect, the wallboard building material provides a much greater resistance to thermal heat transfer. Second, in another aspect, wallboard building material provides enhanced acoustical properties. For example, the wallboard building material disclosed herein, provides a significantly better Sound Transmission Class (STC) rating. Third, the present invention wallboard building material is stronger and lighter.

Utility materials, as disclosed herein, are highly adaptable to a variety of applications. Utility materials, due to their composition or makeup, can be manipulated to achieve different performance characteristics depending upon the intended application for use. For example, it is possible to control the porosity and density of the microparticles to achieve any level desired. This is useful in many applications, such as when a sound or thermal insulating utility material is desired.

In one aspect, the utility materials may be fabricated to comprise a flowable, flexible and/or semi-rigid state. Additionally, the utility materials may be configured to provide enhanced thermal insulation, fire resistance, acoustical insulation, mold retardant and/or other desirable properties. The utility materials can provide enhanced filtering abilities. Furthermore, by varying the number, size, composition, and/or shape of microparticles, the binder material, the ratio of microparticles to binder and other optional components (e.g., surfactant), the processing steps and parameters, and other variables, different utility materials may be formed or created that exhibit different physical characteristics or properties, and that perform in different ways.

In one aspect, the utility material can include rigid utility or building materials, such as wallboard or shear panels, formulated using a plurality of microparticles. The present invention also describes various methods used to produce or fabricate different types of utility or building materials, as well as various applications for such. In general, the utility or building materials of the present invention comprise a plurality of microparticles that are at least bound or adhered together, and preferably bonded together, by one or more binders to create a core matrix structure having a plurality of voids defined therein. Depending upon the selected composition, the building materials may be configured to exhibit certain physical and performance properties, such as strength, flexibility, hardness, as well as thermal and/or acoustical properties, fire resistant properties, etc.

The composition of the core matrix comprises a plurality of hollow, inert, lightweight naturally occurring or synthetic microspheres that are substantially spherical in geometry (hereinafter "microspheres"), as well as at least one binder configured to adhere the microspheres together, and to form a plurality of voids present throughout the core matrix. The binder may comprise an inorganic binder solution, an organic or latex binder solution, or both of these in combination. The core matrix may also comprise various additives, fillers, setting agents, reinforcement materials, etc.

The present invention building material provides several significant advantages over prior related building materials, some of which are recited here and throughout the following more detailed description. First, the present invention building materials are highly adaptable to a variety of applications. For example, depending upon how they are configured, the building materials may be used as wallboard, shear panels, sound boards, stucco boards, and any combination of these. Second, the present invention building materials, due to their composition and/or makeup, can be manipulated to achieve different performance characteristics depending upon the intended application for use. For example, it is possible to control the porosity and density of the microparticles to achieve any level desired. This is useful in many applications, such as when a sound or thermal insulating utility material is desired. Third, the building materials may be configured to provide enhanced thermal insulation, fire resistance, acoustical insulation, mold retardant and other desirable properties. For example, the present invention building materials provide significantly better Sound Transmission Class (STC) ratings.

In addition, the present invention building materials may be used with other similar building materials to create and define a sound trap much more capable of attenuating sound than a walled structure formed of drywall. Other advantages include enhanced resistance to heat transfer, and strong, lightweight materials. Fourth, the building materials provide enhanced filtering abilities. Fifth, by varying the number and size of microparticles, the binder material, the ratio of microparticles to binder (and other components (e.g., surfactant)), and other parameters, different building materials may be formed or created that exhibit different physical characteristics or properties, and that perform in different ways. Sixth, the building materials, in one aspect, may comprise a multi-elevational surface configuration formed in one surface of the core matrix that enhances the sound attenuation properties of the building material.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

In describing and claiming the present invention, the following terminology will be used in accordance with the definitions set forth below.

The singular forms "a," "an," and, "the" include plural referents unless the context clearly dictates otherwise. Thus, for example, reference to "a wallboard" includes reference to one or more of such wallboards, and reference to "the binder" includes reference to one or more of such binders.

As used herein, "substantially" refers to situations close to and including 100%. Substantially is used to indicate that, though 100% is desirable, a small deviation therefrom is acceptable. For example, substantially free of mold includes situations completely devoid of mold, as well as situations wherein a negligible amount of mold is present, as determined by the particular situation.

As used herein, the term "about" is used to provide flexibility to a numerical range endpoint by providing that a given value may be "a little above" or "a little below" the endpoint.

For purposes of discussion and interpretation of the claims as set forth herein, the term "building material," as used herein, shall be understood to mean various types of products or materials incorporating a matrix of microparticles (e.g., microspheres) adhered or bound together using one or more components, such as a binder of some kind. The building materials may comprise other additives, components or constituents, such as setting agents, foaming agents or surfactants, water soluble polymers, and others. The building materials may comprise many different types, embodiments, etc., and may be used in many different applications.

The term "microparticle," as used herein, shall be understood to mean any naturally occurring, manufactured, or synthetic particle having an outer surface, and in some cases, a hollow interior. Generally, the microparticles referred to herein comprise a spherical or substantially spherical geometry having a hollow interior, known as microspheres. Other types of microparticles may include those made from wood, ground rubber, ground up plastic, sawdust, etc.

The term "core matrix," as used herein, shall be understood to mean the combination of microparticles and other constituents used to form the support matrix of the building materials. The microparticles may be combined with one or more binders, additives, setting agents, etc.

The term "multi-elevational" shall be understood to describe at least one surface of the core matrix of the building material, wherein the surface has formed therein a series of peaks and valleys (or protrusions and recesses) to provide an overall surface configuration having different surfaces located in different elevations and/or orientations. The multi-elevational surface configuration may be arbitrarily formed or patterned. In addition, the multi-elevational surface may be defined by any arbitrary or geometrically shaped protruding and recessed components.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

Figure 2:
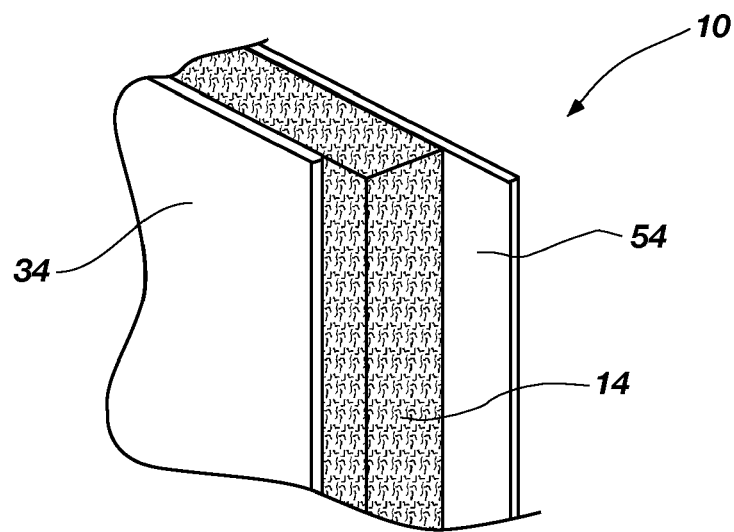
FIG. 2 illustrates a detailed partial perspective view of the wallboard building material of FIG. 1.

With reference to FIGS. 1 and 2, illustrated is a general perspective view and a detailed perspective view, respectively, of a wallboard building material in accordance with one exemplary embodiment of the present invention. As shown, the wallboard building material 10 is in panel form having a size of approximately 4 ft. in width, and 8 ft. in length, which is the same size as most conventional wallboard products. Of course, other sizes such 4 ft. by 12 ft. sizes, as well as different thicknesses is also contemplated. The wallboard building material 10 is shown as comprising a core matrix 14 disposed between opposing facing sheets or layers, namely first facing membrane 34 and second facing membrane 54.

The core matrix 14 is comprised primarily of a plurality of microspheres and at least one binder, wherein the microspheres are at least bound or adhered together, and preferably bonded together, by the one or more binders to create a core matrix structure having a plurality of voids defined therein. The voids are formed from the point to point contact between the microspheres.

The microspheres contemplated for use herein may comprise many different types, sizes, shapes, constituents, etc. Although not limited to this, the microspheres used in the present invention wallboard building material will generally have a size ranging between 100 and 1500 microns, and preferably between 200 and 800 microns, with a bulk density of 0.4-0.6 g/ml, providing products that are much lighter than conventional wallboard building materials, such as gypsum-based drywall. The size of the microspheres will depend upon the application and the performance characteristics desired. However, the particles should not be too large so as to cause any binder disposed thereon to run off or to not be effective. The size of the microspheres will also function to influence the permeability of the wallboard building material.

Perhaps the most significant advantage over conventional products is the ability for the present invention wallboard building material to attenuate or absorb sound. Indeed, the Sound Transmission Class (STC) rating was found to be between 40 and 60 for the present invention wallboard building material (having a thickness of ½ inch), depending upon the composition of the core matrix, the thickness of the wallboard panel, and whether or not a reinforcing material was present. Conventional drywall, also ½ inch thick, has an STC rating of about 33. In testing a wallboard building material based on the embodiment described above, and shown in FIGS. 1 and 2, it was discovered that a sound absorption of around 0.89±0.10 could be reached. In addition, at 3000 Hz, the noise reduction was between 55 and 65 dB. At 2000 Hz, the noise reduction was between 35 and 45 dB. At 1000 Hz, the noise reduction was between 10 and 20 dB. In comparison, drywall had a noise reduction of 40 dB at 3000 Hz; a noise reduction of 28 dB at 2000 Hz; and a noise reduction of 3 dB at 1000 Hz. As can be seen, the present invention wallboard building material is significantly better at absorbing sound.

Figure 3:
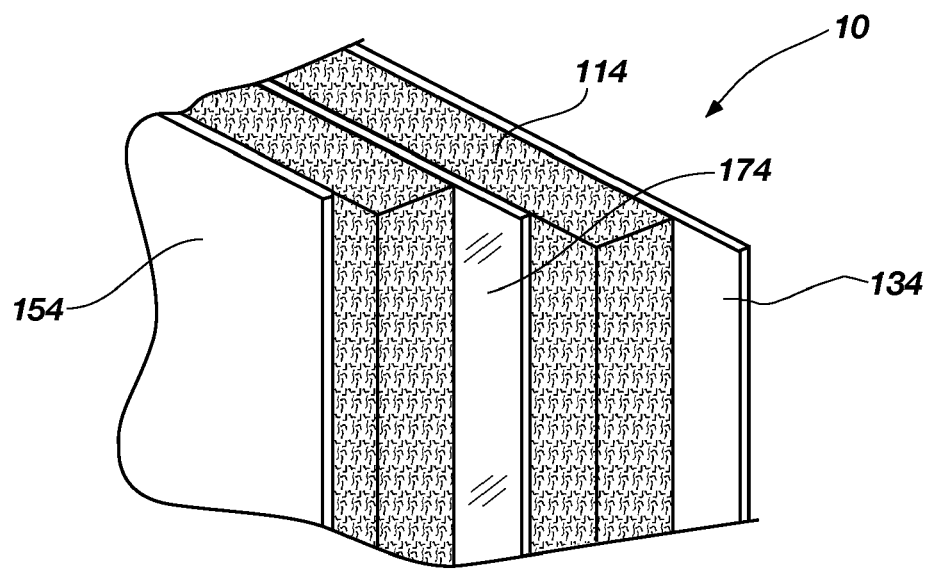
FIG. 3 illustrates a detailed partial perspective view of a wallboard building material in accordance with another exemplary embodiment of the present invention.

With reference to FIG. 3, the wallboard building material may further comprise a reinforcing member operable with the core matrix configured to provide enhanced characteristics in one or more areas as compared with the exemplary wallboard building material of FIGS. 1 and 2. In the exemplary embodiment shown, the wallboard 110 comprises similar components as discussed above with respect to the wallboard 10 of FIGS. 1 and 2, only the wallboard 110 comprises an additional reinforcing member 174 disposed within the core matrix 114 (sandwiched therein). Reinforcing member 174 is configured to reinforce or enhance one or more properties or characteristics of the wallboard 110. For example, the reinforcing member 174 may be configured to reinforce against (or improve the resistance of) sound transmission, heat transfer or a combination of these. The reinforcing member 174 may also be configured to enhance the overall strength of the wallboard building material 110.

The reinforcing member 174 may comprise various types of materials, such as metals, woven or nonwoven fibers or fiber sheets, plastic films, etc., and may comprise any necessary thickness. In the exemplary embodiment shown, the reinforcing member 174 comprises an aluminum material disposed within the core matrix.

Figure 4:
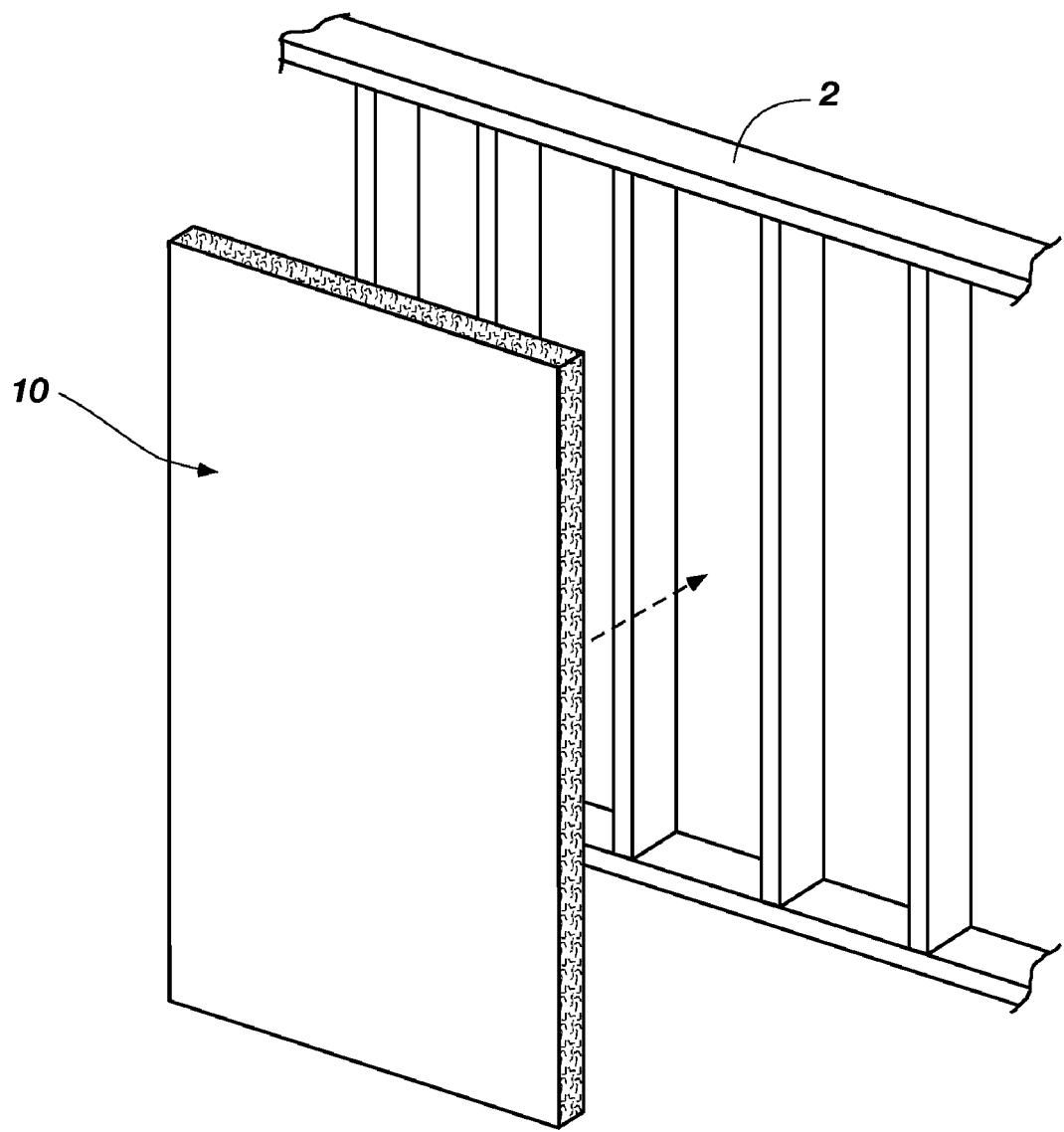
FIG. 4 illustrates a perspective view of a wallboard building material just prior to being installed or mounted onto a stud wall.

With reference to FIG. 4, illustrated is a wallboard building material 10, formed in accordance with one exemplary embodiment of the present invention, just prior to being installed on or hung from a stud wall 2. Specifically, wallboard building material 10 comprises the same components as that of FIGS. 1 and 2. It should be noted that no specialized installation techniques are required for installing or hanging the wallboard building material 10. The wallboard building material 10 may be installed in a similar manner as conventional drywall or other similar products. However, FIGS. 5-A and 5-B illustrate other exemplary embodiments of wallboard building materials that may require one or more special installation techniques. These embodiments are discussed in detail below.

With reference to FIGS. 5-A and 5-B, illustrated are two different examples of coupling and sealing systems, each one being incorporated into a present invention wallboard building material, and each one being configured to couple adjacent wallboard panels together, and to seal or at least partially seal (e.g., not necessarily a strictly airtight seal) the adjacent wallboard panels. The coupling and sealing system is intended to reduce and/or eliminate the flanking path between the adjacent panels adjacent wallboard panels at the joint. The seal may be further enhanced or improved upon nailing, screwing or otherwise securing the joint to a stud in a stud wall. Indeed, the overlap shown is intended to be positioned about a stud, but this may or may not always be possible. The seal functions to resist sound transmission through the joint, and also to resist heat transfer through the joint, by creating a more complex flanking path for heat transfer and sound transmission. In other words, the flanking path is intended to be reduced and/or eliminated if possible by the coupling and sealing system of the present invention.

With specific reference to FIG. 5-A, illustrated are partial end views of a first wallboard building material 210-A and a second wallboard building material 210-B, each one formed in a manner as described herein. The first wallboard building material 210-A comprises a protruding or male configuration 218 formed within and along an edge of the core matrix 214-A, which is intended to align and mate with a corresponding recess or female configuration 222 formed within and along an edge of the core matrix 214-B of the second wallboard building material 210-B. The coupling or connection is designed to secure the first and second wallboard building materials 210-A and 210-B, respectively, in a proper position with respect to one another, and to permit the edges of the membranes 234-A and 254-A of the first wallboard building material 210-A to meet the membranes 234-B and 254-B of the second wallboard building material 210-B. The coupling system further helps to maintain proper positioning after installation. The coupling system may be formed about any of the edges of the wallboard building material.

FIG. 5-B illustrates partial end views of a first wallboard building material 310-A and a second wallboard building material 310-B, each one formed in a manner as described herein. The first wallboard building material 310-A comprises a notch 326 formed within and along an edge of the core matrix 314-A, with the surface parallel to the surface of the membranes 334-A and 354-A optionally comprising a nub 328, also formed from the core matrix 314-A. The notch 326 is intended to align and mate with a corresponding notch 330 formed in the second wallboard building material 310-B to couple together the first and second wallboard building materials. The notch 326 optionally comprises a recess 332 that receives nub 328 therein when the first and second wallboard building materials are secured or coupled to one another. The coupling system shown in FIG. 5-B is intended to perform a similar function as the coupling system shown in FIG. 5-A.

It is noted that the coupling system is integrally formed into the core matrix during manufacture of the wallboard building material. The unique composition of the core matrix provides this capability. The particular size, shape or configuration of the coupling system may vary, and may be formed in accordance with various different manufacturing techniques.

It also contemplated that one or more sealing members or adhesives may be applied to the coupling system to enhance the sealing function achieved by coupling the two wallboard panels together.

With reference to FIG. 6, illustrated is a detailed perspective view of a wallboard building material formed in accordance with one exemplary embodiment of the present invention. This particular wallboard building material embodiment is intended to be and is similar in many respects to the various wallboard building material embodiments described in related copending U.S. Provisional Patent Application No. 60/961,130, filed Jul. 17, 2007, and entitled "Wallboard Building Material", as well as the sound attenuation building materials described in related copending U.S. Provisional Patent Application No. 60/961,242, filed Jul. 17, 2007, and entitled, "Sound Attenuation Building Material and System", each of which are incorporated by reference in their entirety herein.

In a semi-rigid, molded state, the microparticles and binder and any other components are pre-mixed together in such a way so as to form a semi-rigid utility material. The microparticles are caused to dry or harden, as well as to bond via the binder. In one aspect, the pre-mixed composition may then be placed into a mold and formed into a desired size and shape in accordance with one or more molding methods, examples of which are described below.

In another aspect, the pre-mixed composition may be deposited or disposed onto a surface, such as a moving conveyor, and then cut or otherwise formed into the desired size and shape.

The utility materials formed to comprise a semi-rigid makeup may be formed into panels of different size, shape and thickness, such as panels that function as and that have physical characteristics comparable to conventional wallboard. Various backing or containing members may be utilized to support or provide a barrier to the composition. The density of the wallboard building material having the core composition just described can be between 0.4 g/ml and 0.6 g/ml.

Indeed, the utility materials of the present invention may further comprise one or more facing sheets of material disposed on each side of the microparticle and binder composition. In another aspect, a mesh support material may be used, or a combination of a mesh and facing sheet may be used.

In a flexible state, the microparticles and binder and other components are again pre-mixed, but in a way so as to provide a more pliable or workable utility material that may be rolled up or folded upon itself and cut or otherwise divided on-site. The compositions making up a flexible utility material may comprise different types of binder, at least one of which maintains a degree of pliability or flexibility upon being either cured or cross-linked. This particular embodiment is intended to function similar and provide physical characteristics comparable to rolled insulation.

In a flowable embodiment, the microparticles and binder may be combined with a surfactant or foaming agent in order to reduce the water content in the composition, and thus the weight of the material. The composition may be pre-mixed and then whipped or agitated to activate the foaming agent. The bonding of the microparticles may be caused to occur after the composition has been applied to a surface. There are several options for providing a flowable utility material incorporating microparticles.

In one aspect, the components of the composition may be pre-mixed and caused to exist in a flowable state. More specifically, the composition may be caused to exist in a pumpable and sprayable state, wherein the material may be deposited onto or applied to a surface using a spray device, such as that used to spray stucco. In this embodiment, a water-based binder will most likely provide the desired properties that will enable the material to exist in a flowable state, and to be pumped from a pump source to the spray device, and ultimately through a nozzle. Non-aqueous compositions may also be used to produce a flowable composition. The composition may be dispensed prior to drying, or after drying, wherein the composition is broken up into pieces and dispensed, such as to provide a blown-in insulation.

In a second aspect, the components of the composition may be pre-mixed and also caused to exist in a flowable state, wherein the composition is caused to be more viscous than one to be pumped and/or sprayed. In a more viscous state, the composition may be manually spread onto a surface using one or more types of tools. Both water-based and non-water based binders may be used.

In a third aspect, the components of the intended composition may be separated from one another, and then mixed in a mixing chamber in a spray device, or in air as dispensed from the nozzle of the spray device. In this embodiment, there is no pre-mixing of the components of the composition. For example, the microparticles may be contained in one container, with the binder and surfactant each in another chamber. These could be brought together in a mixing chamber in a spray device and then dispersed upon mixing. Both aqueous-based or non-aqueous-based binders may be used.

In a fourth aspect, a percentage of the total microparticles to be present within the finished material may be pre-coated with an A side of a reactive component, and the remaining microparticles pre-coated with a B side of the reactive component. These may then be brought together and caused to react and bond or adhere together.

Utility materials can exist in a variety of forms. Much discussion herein is directed to the specific embodiment of wallboard. However, it should be noted that the principles, compositions, and methods discussed apply to a variety of forms of utility materials, and should be interpreted as such.

In a specific embodiment of wallboard, the present building material comprises an exposed face or side to provide a rough, porous surface. In addition, unlike the sound attenuation building materials incorporated herein, the present building material comprises an exposed core matrix surface having a multi-elevational surface configuration formed therein.

As shown in FIG. 6, the building material 710 is in panel form, similar to a wallboard panel, having a size of approximately 4 ft. in width, and 8 ft. in length, which is the same size as most conventional wallboard products. Of course, other sizes such 4 ft. by 8 ft. sizes, as well as different thicknesses is also contemplated. The building material 710 is shown as comprising a core matrix 714 disposed about a single facing sheet or layer, namely facing membrane 734. The other side 718 of the building material 710 is exposed, or rather the other side of the core matrix 714 is exposed, thus exposing a portion of the configuration of microparticles and binder. The exposed surface of the core matrix provides and defines a rough, porous surface that is designed and intended to better attenuate sound. The exposed side 718 of the core matrix 714 is intended to face inward as the building material is installed or mounted to a structure, such as a stud wall, with the facing membrane 734 facing out.

The core matrix 714 is comprised primarily of a plurality of microspheres and at least one binder, wherein the microspheres are at least bound or adhered together, and preferably bonded together, by the one or more binders to create a core matrix structure having a plurality of voids defined therein. The voids are formed from the point to point contact between the microspheres as secured in place by the binder. The microspheres, as bonded together, provide a significantly more rough surface than if the building material were to comprise an additional facing membrane. The presence of a rough, porous surface functions to significantly improve the sound attenuation properties of the building material by being able to better absorb sound as it attempts to pass through the core matrix. Providing an exposed, rough, porous surface prevents sound from bouncing or deflecting off the building material, but rather permits the sound to penetrate the core matrix where it is quickly and efficiently absorbed.

The microparticles contemplated for use herein may comprise many different types, sizes, shapes, constituents, etc. Although not limited to this, the microparticles used in the present invention building material will generally have a size ranging between about 100 and about 1500 microns, and preferably between about 200 and about 800 microns. In a specific embodiment, the microparticles have a size ranging from about 300 to about 600 microns. In another aspect, the microspheres can have an average mean particle size of about 350 microns to about 450 microns. The microspheres or microparticles can optionally have a bulk density of about 0.4—to about 0.6 g/ml, providing products that are much lighter than conventional building materials, such as gypsum-based drywall or oriented strand board (OSB). The size of the microparticles will depend upon the application and the performance characteristics desired. However, the particles should not be too large so as to cause any binder disposed thereon to run off or to not be effective. The size of the microparticles will also function to influence the permeability of the building material. The microparticles are intended to be compatible with any binders, additives, and/or facing sheets. The shell thickness of the microparticles may be kept to a minimum amount, provided the microparticles maintain structural integrity as desired in the core matrix material. In one aspect, the microparticles can have a shell thickness of less than about 30% of the diameter of the microparticle. Wherein the microparticles are not spherical, the diameter of the particle can be calculated based on the effective diameter of the particle, using the total area of the cross section of the particle and equating such area to a circumferential area and determining the diameter from that value. In a further embodiment, the shell thickness can be less than about 20% of the diameter of the microparticle.

In one exemplary embodiment, the microspheres may comprise hollow, inert, lightweight naturally occurring, glass particles that are substantially spherical in geometry. A hollow interior is preferred as this will reduce the weight of the building material, as well as provide good insulating properties. Furthermore, in one aspect, the microspheres or microparticles maintain structural integrity and retain their hollow nature, or original formation to the exclusion of binder or other matrix materials infiltrating the hollow portions of the microspheres. In one aspect of this embodiment, the microspheres may comprise the naturally occurring hollow, inert, glass microspheres obtained from a fly ash byproduct, which microspheres are often referred to as cenospheres. These cenospheres may be separated from the other byproduct components present in the fly ash and further processed, such as to clean and separate these into desired size ranges. Cenospheres are comprised primarily of silica and alumina, and have a hollow interior that is filled with air and/or other gasses. They possess many desirable properties, such as a crush strength between 3000 and 5000 psi, low specific gravity and are able to endure extremely high temperatures (above 1800° F.). Although they are substantially spherical in overall shape, many are not true spheres, as many are fragmented, or comprise unsmooth surfaces caused by additional silica and/or alumina.

As noted, microparticles or microspheres can include an amount of air or other gasses within the hollow interior. Where possible, the composition of the gaseous material within the microsphere can optionally be selected so as to provide enhanced characteristics of the utility material. For example, the hollow interior can include a noble gas or other known insulating gasses, such as argon, to improve the insulating properties of the overall utility material.

In another exemplary embodiment, the microspheres may comprise artificial hollow, spherical structures manufactured from a synthetic material. One particular type of synthetic microsphere is sold under the trademark Extendospheres™, which are manufactured and sold by Sphere One Corporation. The advantage with having a synthetic material is the uniformity and consistency between microspheres, thus making their behavior and the behavior of the resulting core matrix and building material more predictable. However, these advantages may not be significant enough to justify their use, as synthetic microspheres are extremely expensive to manufacture and can be cost prohibitive in many applications. The use of naturally occurring microspheres over synthetic ones to form a building material may depend on several different factors, such as the intended application, and/or the desired performance properties or characteristics. In some applications, naturally occurring microspheres may be preferred while in others a synthetic type may be more desirable. In one aspect, however, a combination of naturally occurring microspheres and synthetic microspheres can be utilized together in the core matrix. The combination of microspheres can be a homogeneous or heterogeneous distribution throughout the utility material.

In one aspect, microspheres may be present in an amount between 25 and 60 percent by weight of the total core matrix, in wet mixture form. Preferably, the microspheres are present in an amount between about 30 and 40 percent by weight. Other amounts are further contemplated in the event other additives or fillers, such as perlite, or setting agents, such as Class C fly ash, are made part of the core matrix composition. It should be noted that fly ash, of any type, can be utilized as a filler material, and/or optionally as a source of cenospheres. In one aspect, Class C fly ash can be one or the only source of microspheres. Class C fly ash can, in one aspect, be included in a core matrix in an amount ranging from about 0.5 wt % to about 50 wt %. In one aspect, it can be present in combination with synthetically made microspheres at a ratio of Class C fly ash to synthetic microspheres of about 1:15 to about 15:1. In a further embodiment, Class C fly ash can be present in an amount of less than about ⅓ of the amount of microspheres. The Class C fly ash used can optionally include greater than about 80 wt % calcium aluminate silicates, and less than 2 wt % lime.

The present invention further comprises one or more binders operable to couple together the microspheres, and to facilitate formation of the porous core matrix. The microparticles or microspheres can be bound by any manner, including a physical cementing arrangement, chemically binding microspheres, merging boundaries of microspheres, etc. In a specific embodiment, the microspheres can be bound by a physical cementing arrangement, as held together in a matrix of binder, wherein the binder adheres or physically immobilizes the microspheres, but does not form covalent or other chemical bonding with the microspheres. The binder may be caused to adhere the microspheres together, wherein the binder is allowed to dry if water based, or cured in a high temperature environment if non-water based. In another aspect, the binder may be caused to be cross-linked, wherein the binder functions to bond the microspheres together to improve the water resistant properties of the building material.

The ratio of binder to microspheres may vary depending upon the building material to be formed. A higher ratio of binder to microspheres will result in a building material that is more solid and dense than one with a smaller ratio. Indeed, a smaller ratio of binder to microspheres will result in a more porous building material.

The present invention contemplates the use of many different types of binders, again depending upon the desired type of building material to be formed. Different binders may be selected as part of the composition to contribute to the makeup of the resulting building material and to help provide the building material with certain physical and performance properties.

Both aqueous (or water)-based and non-aqueous-based binders are contemplated for use. Any one of these may be used alone or in combination with another binder. Examples of general binder categories include, but are not limited to, thermoplastics, epoxy resins, curatives, urethanes, thermosets, silicones, and others.

In one exemplary embodiment, the binder comprises an inorganic binder, such as sodium silicates in one form or another, combined with an organic binder such as polyvinyl acetate copolymer or ethylene vinyl acetate. The ratio of these binders may vary. In one aspect, the ratio of inorganic binder to organic binder may be 7:3, respectively. Stated more generally, the inorganic binder may be present in an amount between 50 and 60 percent by weight of the total weight of the core matrix, in wet form (the binders comprise an amount of water, or are mixed with an amount of water), with the inorganic binder present in an amount between 5 and 15 percent by weight of the total weight of the core matrix, in wet form. The listed amounts can be based on the pure forms of the binder material, e.g. on pure sodium silicate, or can be based on binder mixtures including optionally water, similar chemical forms, e.g. silicates, silicic acid salts, etc., and other additives. As a non-limiting example, a sodium silicate solution binder commercially sold includes from about 35 wt % to 40 wt % sodium silicate in solution. Furthermore, more than one type of inorganic and/or organic binder can be utilized simultaneously.

In a specific embodiment, the core matrix composition can contain between 400 g and 600 g of microspheres, mixed with between 600 g and 800 g of sodium silicate, and between 200 g and 300 g of ethylene vinyl acetate. Of course, other ranges are possible, depending upon the application. For example, it may be desirable to have between 200 g and 1500 g of sodium silicate or other binder mixed with between 300 and 800 g of microspheres, mixed with between 200 g and 400 g of ethylene vinyl acetate copolymer. Other ratios and ranges of each of the components of various compositions are contemplated. Furthermore, more than one organic binder could be used, as could more than one inorganic binder.

In a specific example, the inorganic binder solution can be present in an amount about 55.5% by weight of the total weight of the core matrix in wet mixture, with the binder solution comprising sodium silicate and water. More specifically, the inorganic binder solution comprises sodium silicate present in an amount between 40% and 60% by weight and water present in an amount between 40% and 60% by weight. In many cases, the inorganic binder solution will comprises a 1:1 ratio of sodium silicate to water. The sodium silicate may be pre-mixed and the solution provided in liquid, or the sodium silicate may be in powder form and subsequently mixed with water.

The latex or organic binder can be present in an amount about 7.4% by weight of the total weight of the core matrix in wet mixture, and comprises an ethylene polyvinyl acetate (EVA) emulsion. The latex binder facilitates formation of a flexible, porous composition that is subsequently formed into the core matrix of the wallboard. One particular example of latex binder used is ethylene vinyl acetate (water-based binder) sold under the trademark Airflex (e.g., Airflex 420), which is manufactured and sold by Airproducts, Inc. This particular binder is used to facilitate the flowable and formable formation of the core matrix, as well as to provide either flexible or semi-rigid compositions. The latex binder can be pre-mixed with water to be in liquid form. The latex binder comprises EVA present in an amount about 40% by weight, and water present in an amount about 60% by weight. In one aspect, the latex binder can range from about 2.5 wt % to about 50 wt %. In a further aspect, the latex binder can range from about 5 wt % to about 30 wt %. Non-limiting examples of latex binders include those produced by Airflex (including specifically 323, 401, 420, 426), those produced by UCAR (specifically 154s, 163s), conventional glues and pastes, those produced by Vinac (including XX210), and mixtures and combinations thereof.

Optionally, water soluble polymers can be included in the core matrix formulation. The water soluble polymer may be added to the core matrix composition already dissolved in water or in dried form. The function of the water soluble polymer is to serve as a stabilizer for any surfactant or foaming agent present in the mixture. Specifically, the water soluble polymer helps to stabilize the composition until the binder is either cured or cross-linked. Non-limiting examples of water soluble polymers that can be included in the formulation include those distributed by Airflex, such as polyethylene oxide, such as, e.g., WSR 301. The water soluble polymer can also function as a thickener and prevent the water from running out. Such polymers can be useful to control the stiffness, flexibility, tear strength, and other physical properties of the building material, as well as to stabilize any surfactants, if present. In some embodiments, it may be desirable to eliminate, or at least significantly reduce, the amount of organic components in the core matrix composition. This is particularly the case in the event it is desirable that the building material comprise more enhanced fire resistant properties. The amount of organic components remaining in the core matrix composition may be dependent upon the particular application.

As mentioned, depending upon the type used, the binder may be simply cured, with no cross-linking, or it may be caused to polymerize or cross-link. By cross-linking the binder(s), a stronger more permanent physical coupling occurs among the binder, thus better physically securing the microspheres. As such, the present invention contemplates using one or more means to effectively cross-link the binders. In one exemplary embodiment, the binders may be cross-linked by elevating the temperatures of the binders to a suitable temperature for a suitable period of time to effectuate polymerization and bonding. This may be done using conventional radiant heating methods, or it may be done using microwaves applied continuously or at various intervals, as well as with microwaves of different intensities. Using microwaves is significantly faster, and much more cost effective. In addition, cross-linking with microwaves may produce a stronger building material as the amount of binder actually cross-linked may be increased. Depending on the binders used, it may be useful to add a limited amount of cross-linking agent to the binder formula in order to increase and/or control the cross-linking.

Cross-linking within a building material provides significant advantages over a building material having a composition that is not cross-linked. For example, with cross-linking, the binders are generally stronger, they do not absorb water as easily, and the connection between microspheres is much stronger. In addition, the building material does not weaken over time. Other advantages may be realized by those skilled in the art. Having said this though, there may be applications where cross-linking is not preferred, and where a non-bonded composition is better suited. This of course, is contemplated herein.

The present invention further contemplates optionally utilizing a surfactant or foaming agent, mixed with the binder and the microspheres to achieve a building material having a relatively low density.

With respect to a foaming process, once ingredients are combined, they may be whipped or agitated to introduce air into the mixture, and then dried. Mechanical agitation or compressed air may be used to physically introduce air into the mixture and to create the foaming process. The foaming process effectively causes microspheres to be supported in a much more separated position with respect to one another as compared to a non-foamed composition. With the presence of the foam, the microspheres suspended and are able to dry in more dispersed configurations. In another aspect, the suspension of the microspheres due to the presence of the foaming agents may also function to make certain core matrix compositions more flowable or pumpable, as well as more formable.

Non-limiting examples of surfactants or foaming agents include, anionic foaming agents, such as Steol FS406 or Bio-terge AS40, cationic foaming agents, and non-ionic foaming agents, etc.

The density of the building material having the core composition just described is generally between 0.4 g/ml and 0.6 g/ml, although such density can vary greatly depending on the selection and amount of each component, as well as the presence or absence of foaming.

The core matrix may further comprise one or more additives or fillers. These may be present in an amount between 0.01 and 50% by weight of the total weight of the core matrix in wet mixture. In one exemplary embodiment, the microspheres may be blended with expanded siliceous inorganic particles, such as perlite, to lower the density of the building material, decrease its weight, and reduce manufacturing costs. Specifically, it is contemplated that expanded siliceous inorganic particles may replace a portion of microspheres in an amount between 1% and 50% by weight of the total weight of the core matrix in wet mixture.

The core matrix may further comprise a setting agent configured or intended to enhance the water resistant properties of the building material, and particularly the core matrix of the building material. In one exemplary embodiment, the setting agent may comprise Class C fly ash. In another exemplary embodiment, the setting agent may comprise zinc oxide. In still another exemplary embodiment, the setting agent may comprise sodium fluorosilicate.

In exemplary core matrix compositions utilizing a setting agent, microspheres may be combined with an inorganic binder (e.g., sodium silicate solution (comprising sodium silicate and water)) in a 1:1 ratio, with the core matrix composition a setting agent present in an amount between 10% and 30% of the total weight of the inorganic binder. For example, the core matrix composition may comprise, as the setting agent, Class C fly ash present in an amount between 15 and 25% of the total weight of an inorganic binder. In another example, the core matrix composition may comprise, as the setting agent, either zinc oxide or sodium fluorosilicate present in an amount between 5 and 15% of an inorganic binder. If an organic binder component is also to be used, such may be combined in an amount between 5 and 20% of the total weight of the inorganic binder component.

The facing membrane 734, shown in FIG. 6, may comprise many different types of materials or combination of materials, and may comprise different properties. In one exemplary embodiment, facing membrane 734 comprises a paper material similar to that found on various wallboard products, such as drywall or the wallboard incorporated by reference herein, as noted above. In another exemplary embodiment, the facing membrane may comprise metal or a metal alloy.

As the final product is desirably a cohesive one, in one aspect, the core material and facing sheet of the wallboard can be optimized for proper or superior adhesion, thus ensuring the facing sheet will remain attached to the core material.

In certain applications, it may be desirable to eliminate the facing sheet altogether. Specifically, to enhance the fire resistant properties of the building material, the facing sheet, particularly if paper, may be eliminated. The core matrix may be configured to be self-supporting, meaning that the building material does not require a facing sheet to maintain its shape and integrity.

FIG. 6 further illustrates the exposed side 718 of the core matrix as comprising a multi-elevational surface configuration. The purpose of providing a multi-elevational surface configuration formed about one surface, particularly the exposed surface, of the core matrix is at least twofold—1) to significantly further enhance the sound attenuation or damping properties of the building material, namely to ensure acoustic isolation and absorption over a wide range of frequencies, and 2) to enhance the flex strength of the building material by eliminating shear lines. As will be described below, many different multi-elevational surface configurations are contemplated herein. Those skilled in the art will recognize the benefits of providing a series of peaks and valleys about a surface to create different surfaces located in different elevations, as well as different surfaces oriented on different inclines, particularly for the specific purpose of attenuating sound. Sound waves incident on these different elevational and/or oriented surfaces are more effectively attenuated.

In the specific embodiment shown, the multi-elevational surface configuration comprises a waffle pattern, with a plurality of protruding members 718, having a square or rectangular cross-section, defining a plurality of recesses 726. This series of peaks and valleys effectively creates a plurality of surfaces (in this case horizontal surfaces 730 and 734) that are located in different elevations about the overall surface of the core matrix 714. In addition, the protruding members 718 may be configured to provide surfaces oriented at different angles (in this case, the protruding members 718 also define several vertically oriented surfaces 738).

It is further contemplated that a separate mesh facing sheet may or may not be disposed over the exposed multi-elevational surface of the core matrix 714. If used, the mesh facing sheet is preferably configured to be flexible to conform to the multi-elevational surface configuration.

Figure 14:
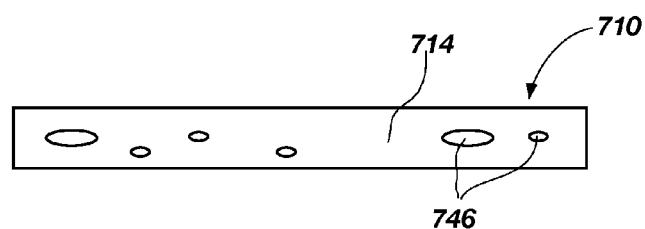
FIG. 14 illustrates a cross-sectional side view of a building material in accordance with another exemplary embodiment, wherein the building material comprises a plurality of strategically formed and located cavities or voids.

FIGS. 6 and 14 further illustrate the building material 710 as comprising a plurality of cavities or air pockets 746 strategically formed and located throughout the core matrix 714, and designed to reduce the overall weight of the building material without significantly affecting the strength or other properties of the building material. Preferably the cavities 746 are randomly located throughout the core matrix 714, but they may also be arranged in a pre-determined pattern. The cavities 746 may be formed in accordance with any known method during the manufacture of the building material. Essentially, the cavities 746 function to define a plurality of voids or air pockets within the core matrix 714 at various locations. The cavities 746 may be sized to comprise a volume between about 0.2 and about 200 $cm^3$, and preferably between about 5 and about 130 $cm^3$.

With reference to FIGS. 7-A and 7-B, shown is a building material formed in accordance with another exemplary embodiment of the present invention. The building material 810 is similar in many respects to the building material 810 discussed above and shown in FIG. 6. However, building material 810 comprises a lath 854 disposed or sandwiched within the core matrix 814. The lath 854 comprises a plurality of intersecting members 856 forming a grid having a plurality of openings 858. The lath 854 functions to provide support and stability to the core matrix 814, as well as additional strength. In addition, the lath 854 increases the mass of the building material 810, which reduces the potential for vibration, thus contributing to the sound attenuation properties of the building material 810. The lath 854 may comprise many different types and configurations, with the grid and openings being of different sizes and configurations. The lath 854 shown in FIG. 7 is not intended to be limiting in any way.

In one aspect, the lath 854 may comprise a metal, fiberglass, or plastic mesh or mesh-like material. This reinforcing lath material provides strength to the building material 810, and further supports the microspheres. The lath 854 may also be made from glass, plastics (e.g., extruded plastics), or other materials, depending upon the particular application and need.

Figure 8:
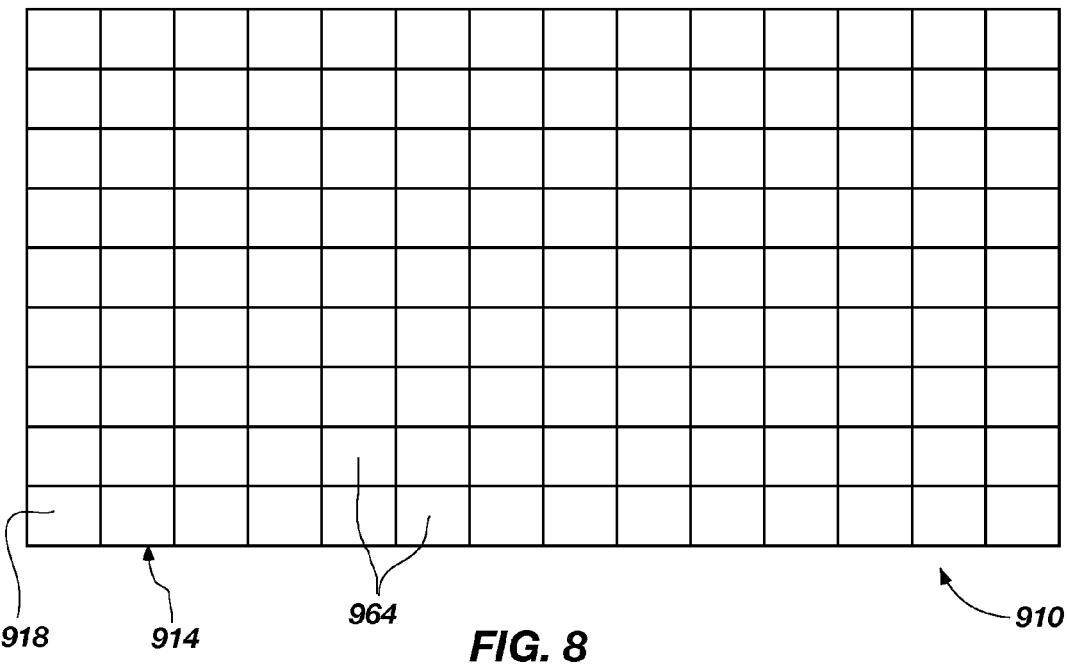
FIG. 8 illustrates a top view of a building material in accordance with still another exemplary embodiment of the present invention, wherein the building material comprises a patterned pillow-like multi-elevational surface configuration formed in the exposed surface of the core matrix.
Figure 9:
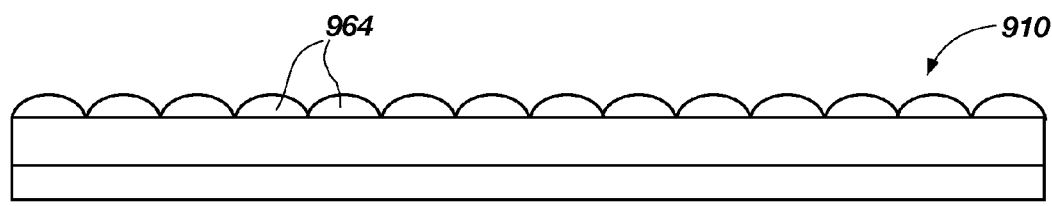
FIG. 9 illustrates a cross-sectional side view of the building material of FIG. 8.
Figure 10:
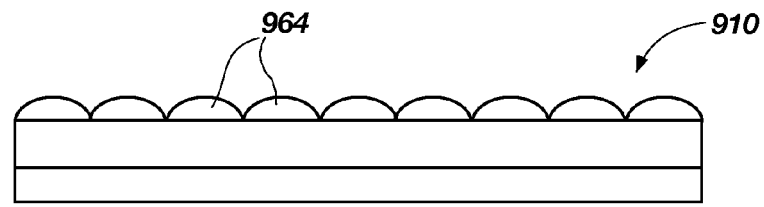
FIG. 10 illustrates a cross-sectional end view of the building material of FIG. 8.

With reference to FIGS. 8-10, illustrated is a building material 910 formed in accordance with another exemplary embodiment of the present invention. In this embodiment, the building material 910 comprises a core matrix 914 having a first surface 918. Formed in the first surface 918 is a multi-elevational or nonplanar surface configuration in the form of a repeating pattern of pillow-type protrusions, thus providing multiple different surfaces or surface areas in multiple different elevations. The protrusions may be any desired size, configuration and height. Therefore, those shown in the drawings are intended to be merely exemplary.

Figure 11:
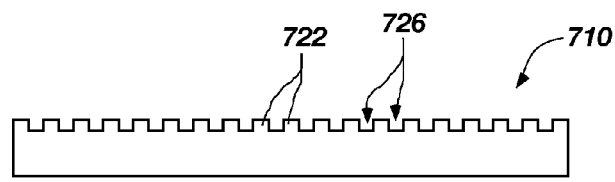
FIG. 11 illustrates a detailed side view of the building material of FIG. 6.

With reference to FIG. 11, illustrated is a side view of the building material 710 of FIG. 6, having a multi-elevational surface configuration in the form of a repeating waffle-type pattern. The waffle-type configuration extends between the perimeter edges of the building material, and defines a plurality of protrusions 722 and recesses 726. FIG. 9 illustrates a cross-sectional view of a building material wherein the building material 710 comprises a plurality of strategically formed and located cavities or voids 746 in the core matrix 714.

Figure 12:
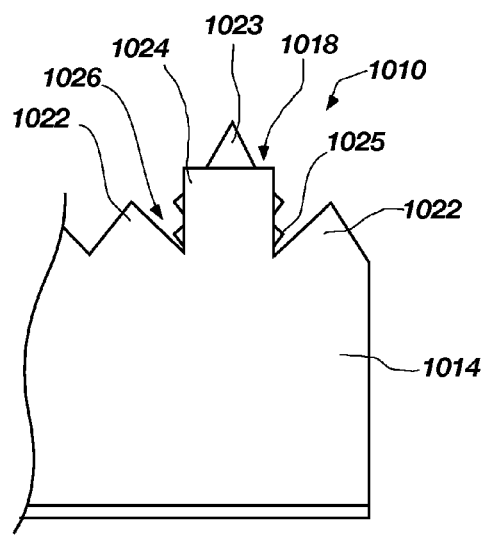
FIG. 12 illustrates a detailed side view of a building material having a multi-elevational surface configuration in accordance with another exemplary embodiment.

FIG. 12 illustrates a detailed side view of another exemplary building material 1010 comprising a core matrix 1014 having a first surface 1018, wherein the first surface 1018 has formed therein a multi-elevational surface configuration comprising a repeating pattern of first protrusions 1022 in the form of pyramids or cones, and a repeating pattern of second protrusions 1024 having an arbitrary shape. The second protrusions 1024 are shown as comprising a primary base protrusion having a square cross-section, upper secondary protrusions 1023, and lateral secondary protrusions 1025, each having a pyramid or cone shape. First and second protrusions 1022 and 1024 define recesses 1026. While the present invention is not intended to be limited to any particular shape of protrusions, FIG. 12 illustrates that arbitrary shapes are at least contemplated.

Figure 13:
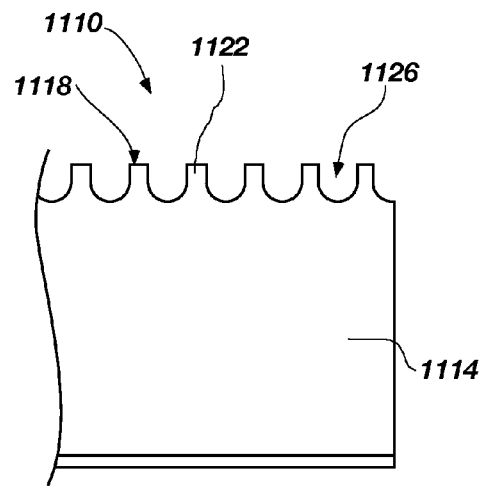
FIG. 13 illustrates a detailed side view of a building material having a multi-elevational surface configuration in accordance with another exemplary embodiment.

FIG. 13 illustrates a detailed side view of another exemplary building material 1110 comprising a core matrix 1114 having a first surface 1118, wherein the first surface 1118 has formed therein a multi-elevational surface configuration comprising a repeating pattern of first protrusions 1122 and recesses 1126, wherein these form an egg carton-type pattern.

FIGS. 8-13 illustrate several different multi-elevational surface configurations. These, however, are not meant to be limiting in any way. Indeed, one skilled in the art will recognize other configurations and/or patterns that may be used to accomplish the designs of the present invention.

As indicated above, the present invention also features a sound attenuation system, which utilizes or comprises opposing present invention building materials configured as described above supported about a building structure, such as a stud or other similar wall to create a walled structure or walled partition, as well as to define a sound trap. The sound attenuation system comprises a first present invention building material supported about a first side of building structure, such as an exterior stud wall, and a second present invention building material supported about a second side of the building structure opposite the first building material. The first and second building materials are supported or mounted to the wall in accordance with practices commonly known in the art.

Mounted in this configuration on the stud wall, the first and second building materials function together to provide and define a volume of space or sound trap, having a thickness t, extending between the inner surfaces of each building material. This sound trap is intended to resist the transmission of sound waves across the walled partition in either direction as these are caused to be absorbed more efficiently by the core matrix, facilitated by the multi-elevational surface configuration formed in the exposed rough surface of the building materials. Sound waves traveling through the first building material toward the second building material are attenuated. As such, the sound attenuation system provides both a higher STC and/or OITC rating over prior related walled partitions formed from conventional drywall and OSB materials. Adding insulation to the present invention walled partition would further enhance the STC and OITC ratings over a walled partition of drywall, OSB and insulation.

Figure 15:
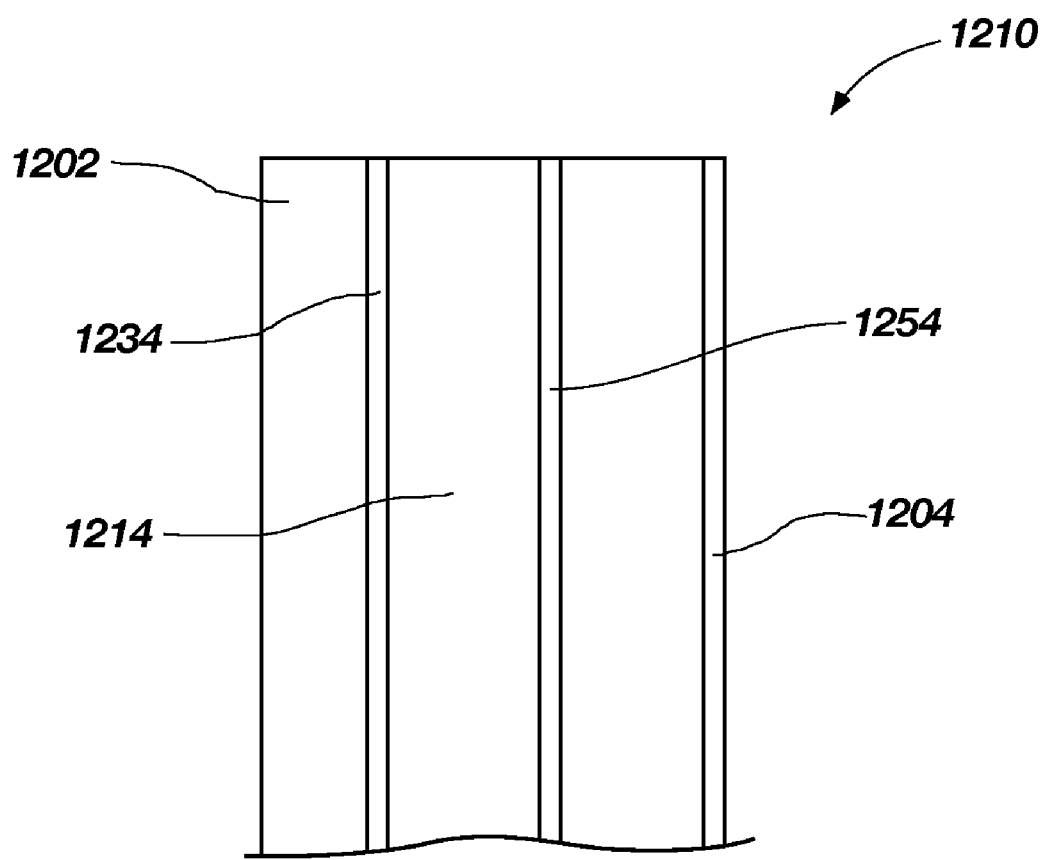
FIG. 15 illustrates a building material configured for use as a finishing material on an exterior of a structure.

Referring now to FIG. 15, illustrated is a building material formed in accordance with another exemplary embodiment. In this particular embodiment the building material 1210 comprises a core matrix 1214, a metal lath 1254 disposed or sandwiched within the core matrix 1214, and a facing sheet 1234 comprised of tar paper. With this configuration, the building material 1210 may be used as a finishing material on the exterior of residential or commercial structures, replacing stucco. The building material 1210, comprising pre-formed panels, can be mounted or secured to the exterior walls 1202 of a structure, say a residential home, much in the same way a wallboard is mounted or secured to the interior walls of a home. Once secured in place, a stucco finish 1204 commonly known in the art may be applied to the panels to create a finished look. The stucco finish can be applied so as to sufficiently conceal any seams or gaps between adjacent building material panels. Some obvious advantages that result from providing exterior finishing panels is the elimination of the labor intensive task of securing metal lath to the exterior walls, subsequently applying plaster over the metal lath, and then waiting several days for the plaster to dry and set prior to being able to apply the stucco finish. With the pre-formed building panels shown herein, installers can mount the panels and apply the stucco finish immediately, thus significantly reducing labor and costs.

It is contemplated that such a building panel may be applied to shear panels, such as oriented strand board, to shear panels formed after the manner of the present invention, or directly to a stud frame, wherein the building panel may function as the shear panel and also receive the stucco finish directly thereto, thus eliminating the need for a separate shear panel.

As noted, the core matrix material, as disclosed herein, can be useful in a variety of utility materials. In one aspect, sodium silicate binder can be utilized with fly ash to produce low cost and fire-resistant insulation. There are many possible applications for this type of insulation including spray-on insulation, loose-fill insulation, righted insulating panels, and molded insulation.

Fly ash can be mixed with sodium silicate binder solution and a surfactant to form a foam that can be sprayed through a conventional texture sprayer. The wet foam can contain between about 2 wt % to about 20 wt % sodium silicate. When dry, the spray-on insulation can contain about 5 wt % to about 35 wt % sodium silicate. The resulting insulation material is lightweight, porous and fire resistant.

In another embodiment, fly ash, sodium silicate binder solution, and a surfactant are used to form loose-fill insulation. The foam can be dried at room temperature, or heated to about 300° F. to about 400° F. to speed up the dry time and to make the insulation more water resistant. The foam is then broken up into small pieces and used as loose-fill insulation.

Alternatively, the porous foam can be used to form rigid insulating panels. The foam can be deposited into molds of the desired size, shape, and thickness to form panels. The foam can be dried at room temperature or heated to about 300° F. to about 400° F. to speed up the dry time. The resulting insulation is lightweight, fire-resistant and relatively inexpensive. The strength and density of the insulation can be varied by varying the sodium silicate content of the mixture.

The foam can also be used to form molded insulation. The fly ash, sodium silicate binder solution can be mixed and poured into a mold to produce lightweight insulation in any desired shape for a variety of applications. The foam can be dried at room temperature, or optionally heated to about 300° F. to about 400° F. to speed up the dry time and complete the drying of the silicate.

As noted, a variety of methods can be useful in forming utility materials as presently contemplated. In one aspect, a method of forming a wallboard utility material can include first placing a precut facing sheet, such as a wallboard paper white, face down in an appropriate mold. A formable composition can be formed by mixing microparticles, and binder. The formable composition can be spread over the paper in the mold and can be smoothed using any method. A second facing sheet, such as a brown wallboard paper, can be placed over the mixture. A flat mold lid can be placed on top of the paper and fastened in place. The wallboard can optionally be microwaved for any period, including about 30 minutes. If utilized, microwaving can preferably be completed at partial power for the first length of microwaving. The formed composition can alternatively be directly placed in a heater to heat cure the panel. If microwaved first, the composition can be subsequently placed in a heater to further heat cure the panel. Heat curing can occur at temperatures greater than room temperature, and preferable less than temperatures required to cause damage or degradation of the paper, mold, or components of the formable composition. In one embodiment, a convection oven can be used at 325° F. for about one hour.

Utility materials as described herein exhibit superior qualities to many utility materials currently available. Furthermore, the superior qualities co-exist, where a material may exhibit both mold resistance and enhanced acoustic properties simultaneously. Wallboards formed of the utility materials are typically lighter than conventional gypsum wallboard by 20% to 30%. An installed R value can be up to about 19. Noise attenuation can be up to about 50 db, depending on the frequency for a ½ inch thick piece of wallboard. The core matrix won't grow mold. Wallboard is water resistant and is still hard after 2 weeks of continuous submersion under water. The material can be formulated to be fire resistant. Wallboard exhibits strong flexural strength up to two times that of conventional gypsum wallboard (e.g., 280 lbs vs. 140 lbs). Furthermore, the wallboard can withstand impacts without crumbling or displacement in surrounding areas such as a corner.

In a plurality of tests conducted on a present invention wallboard material (including microspheres, sodium silicate, and an organic binder), the following results were collected: flexural strength range 137.2 lbf to 164.9 lbf, average 153 lbf; nail pull 72-87 lbf, average 78 lbf; weight of 4 inch by 8 inch by ½ inch sheet average 42.1 lbs; acoustic transmission based on a variety of frequencies ranging from 80 to 8000, average 50.9 db; R value range 16.2 to 19, average 17.5; mold resistance found no measurable mold growth; fire resistance testing found no combustion for exposure to propane torch flame for 15-120 minutes; and edge hardness 14-16 lbf, average 15.1 lbf. As shown, the wallboard material excels in a plurality of desirable qualities and provides a superior construction material.

EXAMPLES

The following examples illustrate embodiments of the invention that are presently known. Thus, these examples should not be considered as limitations of the present invention, but are merely in place to teach how to make the best-known compositions and forms of the present invention based upon current experimental data. Additionally, some experimental test data is included herein to offer guidance in optimizing compositions and forms of the utility material. As such, a representative number of compositions and their method of manufacture are disclosed herein.

Example 1

Testing Of Utility Material of Cenospheres and Sodium Silicate

A mixture of Cenospheres of the form of Extendospheres™ and sodium silicate were combined and allowed to dry and form a fire-resistant insulating material Extendospheres of a 300-600 micron diameter size range were combined with sodium silicate solution (O type from PQ corporation) in a 1:1 weight ratio. The wet slurry was poured into a cavity around the turbine and allowed to dry. It formed a hardened mass of extendospheres and sodium silicate. The material was tested with an Ipro-Tek single spool gas turbine. The tests showed that the material has a high insulation capacity, and the ability to withstand heat. The insulation was exposed to temperatures of up to 1200° C. However, it was found that when the material is exposed directly to flames for periods of more than a few minutes, it cracks and blisters and begins to lose physical strength.

Example 2

Formation of Mold to Form Wallboard

Figure 16:
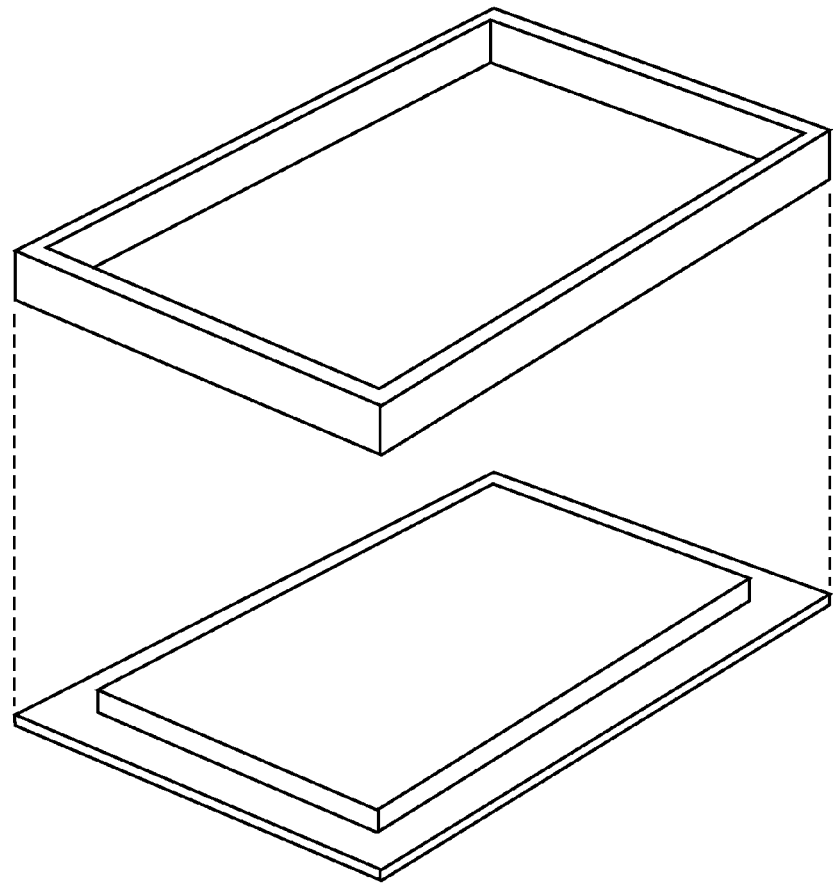
FIG. 16 illustrates a perspective view of a wood mold of for a bottom piece of a porous mold, in accordance with one aspect of the present invention.

In one aspect, the utility material can be wallboard panels. The panels can optionally be formed by exposing an uncured wallboard to microwaves. Such formation, as well as general wallboard formation, can utilize a mold. An example of a mold can be made up of a vinylester resin mold having top and bottom pieces. To form the vinylester resin mold, a wood mold is first constructed. The wood mold can be formed according to the shape and dimensions as illustrated in FIG. 16.

To form the vinylester resin mold, an outer mold of wood is attached to the base of the wood mold using double sided tape. Any releasable binder or means of attaching can be alternatively used. A resin mixture is formed of 97.5 wt % vinylester resin mixed with 2.5 wt % methyl ethyl ketone peroxide (MEKP) catalyst. Microspheres of the form of Extendospheres and the resin mixture are added in a 1:1 ratio to form a core mixture. The core mixture is mixed well using a stirring device that was mounted in a drill such as you would use to mix paint. Mix time was about 3 minutes. The core mixture is poured into the prepared wood mold and distributed to cover the full mold, including all corners. The mixture is gently smoothed out, although not pressed into the mold using short dropping, manual shaking, mechanical vibration, and spreading tools such as trowels. The mixture is not pressed into the wood mold as pressing it can decrease the porosity of the resulting vinylester resin mold and can make it unusable. The mixture is cured at room temperature until it is rigid and strong to the touch. The curing time is typically about three hours. The porous vinylester resin mold is then carefully removed. The resulting vinylester resin mold has a cavity 11.625 inches by 15.25 inches by 0.5 inches deep, with a 0.375 inch wall around the outside edge. A top piece for the vinylester resin mold is formed using the same procedure and results in a mold in a rectangle having dimensions of 12.375 inches by 16 inches by 0.5 inches deep.

Example 3

Preparation of Wallboard Using Mold

Figure 17:
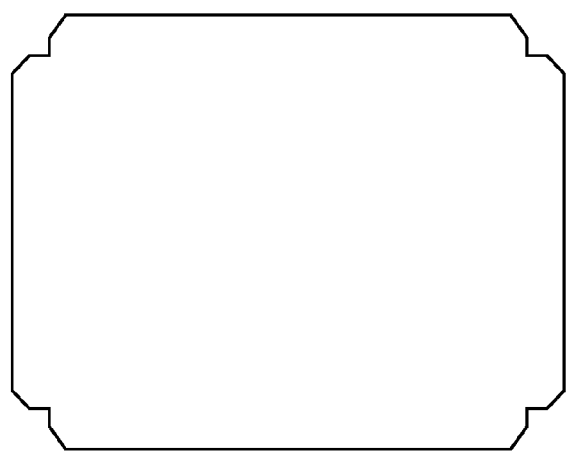
FIG. 17 illustrates a top view of a backing paper template, in accordance with one aspect of the present invention.

As noted, the utility material can be in the form of wallboard panels. The panels can optionally be formed by using the porous vinylester resin mold. First, a wallboard backing paper is cut using a backing paper template as shown in FIG. 17. Although a particular backing paper shape is illustrated, it should be understood that the backing paper can be of any shape or size sufficient to form a segment of wallboard. Facing paper is cut to a rectangle sized just smaller than the greater dimensions of the backing paper. In the present embodiment, the facing paper is cut to an 11.625 inch by 15.25 inch rectangle. The backing paper is folded and placed in the porous mold. A wallboard mixture may be formed using:
700 to 900 g microspheres
1100 to 1300 g sodium silicate solution, such as that sold by "O"
300 to 500 g latex binder
20 to 30 cc foaming agent Specifically, the foaming agent is added first to the sodium silicate solution and mixed using a squirrel mixer at 540 RPM for 2 minutes. The latex binder is added to the mixture and mixed for an additional 30 seconds on the same settings. The microspheres are added slowly while mixing, over 1 to 2 minutes, until the mixture is uniform.

The wallboard mixture is poured into the lined mold and leveled out using a spatula or paint stick. It should be noted that any tool or method could be used at this point to level the mixture. The mixture is further leveled by vigorous shaking. The sheet of facing paper is placed on top of the mixture and covered with the top panel of the vinylester resin mold. The mold is placed in a microwave and the panel is radiated for the desired amount of time. Preferably, the mold is turned often to produce a more even drying of the panel. The panel should not be subjected to continuous radiation for any extended amount of time to reduce or prevent large voids in the wallboard core. The power level of the microwave radiation can be set to control the amount of time the microwave is on. The time on and off of the microwave can be according to Table 1:

TABLE 1

| Power Level | Time On (Seconds) | Time Off (Seconds) |
|---|---|---|
| 1 | 3 | 19 |
| 2 | 5 | 17 |
| 3 | 7 | 15 |
| 4 | 9 | 13 |
| 5 | 11 | 11 |
| 6 | 13 | 9 |
| 7 | 15 | |
| 8 | 17 | 5 |
| 9 | 19 | 3 |
| 10 | 22 | 0 |

Once properly heated, the resulting panel of wallboard can be carefully removed from the mold.

Example 4

Flexural Strength Testing

An important feature of wallboard is the flexural strength of the board. Each sample board was prepared by forming a core matrix material including the components outlined in Table 2 and spreading the mixture into a mold cavity and leveling it off. The resulting sample is 0.50 inches thick and 2 inches wide. Each sample is dried in an oven at 100° C. until dry as determined by Aquant moisture meter. The sample is suspended between two supports that are 6 inches apart so that 1-1.5 inches rests on either side of the support. A quart size paint can is placed in the center of the suspended sample and slowly filled with water until the sample breaks at which point the weight of the can is measured and recorded. Flexural strength is important for normal handling, installation, and use. Strength at least equal to gypsum wallboard was desired, for uses wherein the wallboard could replace conventional gypsum wallboard. Each wallboard includes a different composition as outlined in Table 2.

TABLE 2

| Run | Cenospheres (g) | Water (g) | Binder (type, g) | Foaming Agent (g) | Dry weight (g) | Weight to break (kg) |
|---|---|---|---|---|---|---|
| 1 | 50 | 6.0 | O, 52.4 | 1.0 | 70.2 | 5.0 |
| 2 | 50 | 0 | O, 87.2 | 2.0 | 83.7 | 20.6 |
| 3 | 50 | 14.1 | RU, 42.9 | 1.0 | 70.2 | |
| 4 | 50 | 14.4 | RU, 71.4 | 2.0 | 83.6 | 18.0 |
| Foam | 50 | 20 | RU, 71.4 | 16.4 | 83.6 | 9.2 |
| 5 | 50 | 8.0 | BW-50, 47.6 | 1.0 | 70.2 | 5.1 |
| 6 | 50 | 7.0 | BW-50, 79.2 | 2.0 | 83.7 | 7.4 |

The ingredients in each row were combined then mechanically whipped to produce a foamed product. The foamed product was then cast in a mold. All binders used are sodium silicate based. Type O binder is a viscous sodium silicate solution from PQ Corporation. Type RU binder is also from PQ Corporation and is a sodium silicate solution that is similar to O type but not as viscous. RU type is more watery and has a lower solids content. And, type BW-50 binder, also from PQ Corporation. BW-50 is also a sodium silicate solution, and has a lower ratio of silica to disodium oxide. As illustrated, the amount and type of binder can be optimized to create a wide range of flexural strengths.

Example 5

Flexural Strength Testing II

Flexural strength testing was conducted on seven sample boards according to the procedure outlined in Example 4. The components of each sample board and the flexural strength testing weight are recorded in Table 3.

TABLE 3

| Run | Cenospheres (g) | Water (g) | Binder (g) | Foaming Agent (g) | Dry weight (g) | Weight to break (kg) - no paper | Weight to break (kg) - Manilla folder | Weight to break (kg) - cardboard |
| --- | --- | --- | --- | --- | --- | --- | --- | --- |
| 1 | 50 | 17.9 | 14.3 | 1.0 | 56.7 | | | |
| 2 | 50 | 15.5 | 28.6 | 1.0 | 63.5 | 2.06 | | |
| 3 | 50 | 12.1 | 42.9 | 1.0 | 70.2 | 11.96 | 21.55 | |
| 4 | 50 | 14.3 | 57.1 | 2.0 | 76.9 | 14.37 | | |
| 5 | 50 | 14.4 | 71.4 | 2.0 | 83.6 | 15.35 | 26.89 | 36.65 |
| 6 | 50 | 11.6 | 85.7 | 2.0 | 90.4 | 21.8 | | |
| 7 | 50 | 9.4 | 100.0 | 2.0 | 97.1 | 20.85 | 29.40 | 34.99 |
| Ceiling Tile ½" thick | | | | | | | 5.57 | |
| Dry wall ½" thick | | | | | | | 26.91 | |

As illustrated, increasing the density and increasing the binder content in the sample generally results in stronger samples. Increasing the amount of water in the sample mixture generally decreases the density of the mixture and results in decreased strength of the sample. In the samples including testing with a Manilla folder and/or cardboard, the noted material was placed on both sides of the sample. Such arrangement, with the core material flanked by a paper product, is comparable to conventional gypsum wallboard. As illustrated, the inclusion of paperboard on both sides, either in the illustrated form of Manilla folder or cardboard, significantly increased the sample's strength.

Example 6

Flexural Strength Testing III

A number of sample panels were formed according to the procedure outlined in Example 4, with the exceptions that strips of paper of the noted thickness to 2 inches wide by 11 inches long. One strip is placed in the mold cavity before pouring in the core matrix material. After pouring and leveling the mixture, another sheet of the same thickness is placed on top of the mixture. The mixture is covered with wire mesh and weighed down to keep it in place during drying. For the results listed below, the paper did not properly adhere to the core matrix, so the test results reflect samples having only one sheet of paper attached. The flexural strength tests were performed paper side down. Presumptively, the results would be higher for a sample including both facing sheets.

The core matrix material for each sample included 250 g Extendospheres, 40 g water, 220 g binder, 10 g foaming agent. The dry weight for each sample is 334.9. For paper having a thickness of 0.009", the weight to break was 6.6 kg. For paper having a thickness of 0.015", the weight to break was 7.5 kg. For paper having a thickness of 0.020", the weight to break was 5.2 kg.

Example 7

Additional Testing on Sample Boards

A number of sample panels were formed in accordance with the methods and compositions outlined in the previous Examples. Typically, a mixture such as that given above is cast in a mold comprising paper disposed above and below the core and a frame around the perimeter of the sample to contain the wet core material while it dries and cures. After drying and heating the wallboard sample can be tested for mechanical properties. The composition of each sample and the associated results are illustrated in Table 4.

Flexural Strength Testing—"Flex"

A 0.5 inch thick sample that is 2 inches wide by 6 to 8 inches long is placed on the test fixture and is thus suspended between two legs. The legs are approximately 4.25 inches apart. The test apparatus is equipped with the flexural test attachment, with the bar on the attachment situated parallel to the test specimen. The flexural test attachment is centered midway between the legs of the test fixtures. A bucket is hooked to the end of the test apparatus and weight is slowly added to the bucket until the test specimen fails. The weight of the bucket is measured to obtain the Flex results.

Nail Pull Resistance Testing

A 0.5 inch thick sample that is 6 inches wide by 6 inches long is drilled to have a 5/32 inch pilot hole in the center of the sample. The sample is placed on a nail pull fixture, with the pilot hole centered on the 2.5 inch diameter hole in the nail pull fixture. A nail is inserted into the pilot hole. The shank of the nail should be approximately 0.146 inches in diameter, and the head of the nail should be approximately 0.330 inches in diameter. A screw is inserted into the indicated hole on the test apparatus so that it sticks out a distance of approximately 2 inches. The head of the screw should be smaller than the head of the nail used in the test. The sample and fixture are positioned underneath the apparatus so that the centerlines of the nail and screw line up. A bucket is hooked to the end of the test apparatus. Weight is slowly added to the bucket until the test specimen fails. The weight of the bucket is measured.

Cure, End, and Edge Hardness Testing

A 0.5 inch thick sample that is 2 inches wide by 6 to 8 inches long is clamped in the vice of the testing equipment. A screw is inserted into the indicated hole on the test apparatus so that it sticks out a distance of approximately 1.5 inches. The head of the screw should be 0.235 inches in diameter. The vice and sample are positioned underneath the test apparatus, so that the head of the screw is centered on the 0.5 inch edge of the sample. A bucket is hooked to the end of the test apparatus. Weight is slowly added to the bucket until the screw penetrates at least 0.5 inches into the sample. If the screw slips off of the side and tears through the paper, the sample is discarded and the test is repeated.

TABLE 4

| Run | Cenospheres (g) | Organic Binder (g) | Foaming Agent (g) | Water (g) | Dry Weight (g) | Flex | Hardness | Nail Pull | Density |
|---|---|---|---|---|---|---|---|---|---|
| 1 | 50 | 75 | 0 | 20 | 78.73 | 30.3 | | | 10.5 |
| 2 | 50 | 75 | 0 | 20 | 78.73 | 41.6 | | | 7.9 |
| 3 | 50 | 75 | 0 | 20 | 78.73 | 24.7 | | | 7.7 |
| 4 | 50 | 75 | 1 | 0 | 78.73 | | | | |
| 5 | 50 | 75 | 2 | 0 | 78.73 | 17.6 | | | |
| 6 | 50 | 100 | 0 | 0 | 88.30 | 17.6 | | | 10.3 |
| 7 | 50 | 100 | 1 | 0 | 88.30 | 31.3 | 13.6 | 22.6 | |
| 8 | 50 | 100 | 1 | 0 | 88.30 | 16.3 | | | 6.8 |
| 9 | 50 | 100 | 1 | 0 | 88.30 | 19.4 | | | 6.3 |
| 10 | 50 | 100 | 2 | 0 | 88.30 | 16.6 | | | |
| 11 | 50 | 125 | 0 | 0 | 97.88 | 22.5 | | | 8.2 |
| 12 | 50 | 125 | 0 | 0 | 97.88 | 35.0 | | | 8.5 |
| 13 | 50 | 125 | 0 | 0 | 97.88 | 31.6 | | | 7.9 |
| 14 | 50 | 125 | 1 | 0 | 97.88 | 23.7 | | | 7.3 |
| 15 | 50 | 125 | 2 | 0 | 97.88 | 22.4 | | | 6.5 |
| 16 | 50 | 150 | 0 | 0 | 107.45 | 35.8 | 41.8 | 31.0 | 9.8 |
| 17 | 50 | 150 | 0 | 0 | 107.45 | 27.5 | | | 8.3 |
| 18 | 50 | 150 | 0 | 0 | 107.45 | 21.8 | | | 7.5 |
| 19 | 50 | 150 | 1 | 0 | 107.45 | 18.0 | | | 9.0 |
| 20 | 50 | 150 | 2 | 0 | 107.45 | 16.6 | | | 6.6 |
| Dry-wall average of 5 tests | | | | | | 30.9 | 38.0 | 53.6 | 10.4 |

Example 8

Test Results II

A sample of wallboard including 50 g Extendospheres, and 2 cc surfactant. The first type of wallboard tested included 100 g of sodium silicate binder mixture. The second type of wallboard tested included 75 g sodium silicate binder mixture and 25 g latex binder. The test boards had a thickness range from 0.386 inches to 0.671 inches. Testing was completed according to ASTM 473-3, 423, E119, and D3273-00 standards.

Flexural strength was tested and determined to be an average of 170 lbf (white side up) for the wallboard of the first type, based on three samples. The wallboard of the second type was found to average 101 lbf (white side down), based on three samples. The highest measurement of the six test samples was 197 lbf. A comparative conventional gypsum wall board was measured to be 107 lbf.

Edge hardness was determined to be an average of 15 lbf. The gypsum wall board had an average minimum edge hardness of 11 lbf. The sample showed a 36% improvement over the gypsum sample.

Nail pull resistance was measured to be 99 lbf, based on a 3 sample average. The gypsum wall board, on the other hand, measured a 77 lbf.

The thermal resistance of the sample wall board was tested. One side of the wall board was raised to 100° C. for two hours with no measurable temperature increase on the cool side of the sample.

The weight of the sample was compared to the conventional gypsum and found to be approximately 30% less than the gypsum board.

Example 9

Wallboard Formation

As another example of wallboard formation, a sodium silicate wallboard is formed by the following procedure. Sodium silicate is first foamed by adding 2 cc Steol FS 406 to 100 g sodium silicate solution (PQ Corporation O binder). The mixture is placed in a 6 inch diameter paint container. The mixture is mixed using a 3 inch diameter "Squirrel" mixer attached to a drill press running at 540 rpm. The operator rotates the paint container in the opposite direction than that of the mixer. The mixture is foamed for approximately one minute and fifteen seconds. The volume of the sodium silicate should at least double during the foaming process. 50 g of Extendospheres™ (having a size of 300 to 600 microns) are added to the mixture and mixed for one more minute with the "Squirrel" mixer. The vanished mix is then poured into the mold and smoothed with a paint stick.

Once the foamed mixture is smoothed in the mold, the mold is placed in an oven set at 85° C. The mixture is allowed to dry for approximately 12 hours at this temperature.

The backing paper is added to the core after the core has dried sufficiently. A light coat of sodium silicate is painted onto the back of the paper, and the paper is placed on the core matrix. The core and paper are covered on all sides by a polyester breather material and then placed in a vacuum bag. The vacuum bag is placed in an oven set at 85° C. and a vacuum is applied to the part. The part is allowed to dry for 45 minutes to one hour in the oven. The finished part is then removed from the oven and trimmed to desired size. Various materials can optionally be added to the core composition to accelerate drying.

Example 10

Wallboard Formation II

Another wallboard is produced according to the method in Example 9. The composition of the wallboard is altered in that 75 g of sodium silicate binder solution is used along with 25 g organic binder. The organic binder is added to the sodium silicate binder solution along with the Steol, prior to foaming.

Example 11

Wallboard Formation III

Another wallboard is produced by first masking a mold. A base board is lined with FEP. The FEP is wrapped tightly to reduce wrinkling on the surface. Boarder pieces of the mold are wrapped with Blue Flash Tape. Killer Red Tape is used to attached to border pieces to the base piece to form a border with an inside dimension of 14 inches by 18 inches.

500 g of microspheres (300-600 microns in size), 750 g "O" binder, 250 g organic binder, and 20 cc foaming agent are measured and set aside. The O binder and foaming agent are mixed using a Squirrel mixer at 540 RPM for about 2 minutes. The organic binder is added to the mixture and mixed for an additional 30 seconds. The microspheres are slowly added while mixing. When all microspheres are added, the mixture is mixed for an additional 30 seconds or until the mixture is uniform. The mixture is poured into the mold and leveled with a spatula. The mold is additionally subjected to vigorous shaking for additional leveling. The mold is placed into an oven at 100° C. and dried for 12 to 18 hours until completely dry. Paper is applied to the sample by first cutting a piece of backing paper and a piece of facing paper slightly larger than the panel. An even coat of sodium silicate solution is applied to one side of the paper. The paper is placed on top and bottom surfaces of the panel and pressure is applied evenly across the surface. The pressure can optionally be applied by vacuum bagging the panel. The panel can be placed back in the oven at 100° C. for about 15 minutes until the paper is fully adhered to the surface of the panel.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A wallboard building material comprising:
    a first facing membrane and a second facing membrane, wherein the first facing membrane and the second facing membrane are independently selected from the group consisting of paper, metal, and metal alloys; and
    a core matrix sandwiched between the first facing membrane and the second facing membrane, wherein the core matrix includes:
    from about 25 wt % to about 60 wt % of microspheres based on wet formulation, the microspheres having a size of from about 100 to about 1500 microns, wherein the microspheres are all cenospheres, each cenosphere comprising an outer shell and a hollow interior filled with a gas; and
    from about 20 wt % to about 36 wt % sodium silicate binder; and
    from about 5 wt % to about 15 wt % organic binder, wherein the microspheres are bonded together by the sodium silicate binder to create a plurality of voids between the microspheres,
    wherein a cured core matrix material formed therefrom is resistant to substantially all mold growth.

2. The wallboard building material of claim 1, wherein the microspheres are present in an amount from about 30 wt % to about 40 wt % of the wet mixture.

3. The wallboard building material of claim 1, wherein the wallboard has an R value, when installed on a stud wall, of at least 15.

4. The wallboard building material of claim 1, wherein the wallboard having ½ inch thickness has a noise attenuation of greater than about 40 db.

5. The wallboard building material of claim 1, wherein the wallboard has a flexural strength of greater than 50% of that of gypsum wallboard of the same size and shape.

6. The wallboard building material of claim 1, further comprising a coupling system integrally formed in said core matrix, said coupling system operating to facilitate coupling of a first wallboard panel to a second wallboard panel, and to at least partially seal said first and second wallboard panels.

7. The wallboard building material of claim 1, wherein the core matrix includes cross-linking.

8. The wallboard building material of claim 1, wherein the core matrix further includes at least one additive selected from the group consisting of water soluble polymers, setting agents, foaming agents, and combinations thereof.

9. The wallboard building material of claim 1, further comprising a reinforcing member disposed within said core matrix, said reinforcing member being configured to reinforce said building material in one or more ways selected from the group consisting of reinforcing against sound transmission, reinforcing against heat transfer, enhancing strength, and any combination of these.

10. The wallboard building material of claim 1, wherein said building material comprises a Sound Transmission Class (STC) rating between 35 and 65.

11. The wallboard building material of claim 1, wherein said building material comprises a decibel noise reduction value between 55 and 65 dB at 3000 Hz, for a ½ inch thick wallboard.

12. The wallboard building material of claim 1, further comprising a plurality of cavities strategically formed throughout said core matrix.

13. The wallboard utility material of claim 1, wherein the microspheres contain an insulating gas.

14. The wallboard building material of claim 1, wherein the organic binder is vinyl acetate.

15. A method for manufacturing a wallboard building material of claim 1, comprising:
- forming the core matrix of claim 1 by mixing together the microspheres, the organic binder, and the sodium silicate;
- sandwiching the core matrix between the first facing membrane and the second facing membrane; and
- heat curing the formable composition sufficient to form the core matrix, the first and second facing membranes being configured to adhere to the core matrix.

16. A method for manufacturing a wallboard building material comprising:
- combining from about 25 wt % to about 60 wt % of a plurality of microspheres based on wet formulation with from about 20 wt % to about 36 wt % of a sodium silicate binder and from about 5 wt % to about 15 wt % of an organic binder organic binder to produce a formable composition, wherein the microspheres are all cenospheres having an outer shell and a hollow interior filled with gas and have a size of from about 100 to about 1500 microns;
- disposing the formable composition onto a surface;
- sandwiching the formable composition between a first facing membrane and a second facing membrane;
- heat curing the formable composition sufficient to form a core matrix such that the microspheres are bonded together by the sodium silicate binder to create a plurality of voids between the microspheres, the first facing membranes and the second facing membrane adhering to the core matrix; and
- wherein the first facing membrane and the second membrane are independently selected from the group consisting of paper, metal and metal alloys.

17. The method of claim 16, further forming cross linking in at least a part of the core matrix material.

* * * * *